United States Patent
Perazzi et al.

(10) Patent No.: US 12,112,456 B2
(45) Date of Patent: Oct. 8, 2024

(54) RETOUCHING DIGITAL IMAGES UTILIZING LAYER SPECIFIC DEEP-LEARNING NEURAL NETWORKS

(71) Applicant: Adobe Inc., San Jose, CA (US)

(72) Inventors: Federico Perazzi, San Jose, CA (US); Jingwan Lu, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 210 days.

(21) Appl. No.: 18/045,730

(22) Filed: Oct. 11, 2022

(65) Prior Publication Data

US 2023/0058793 A1 Feb. 23, 2023

Related U.S. Application Data

(63) Continuation of application No. 17/072,372, filed on Oct. 16, 2020, now Pat. No. 11,521,299.

(51) Int. Cl.
| | |
|---|---|
| G06K 9/00 | (2022.01) |
| G06F 18/21 | (2023.01) |
| G06N 3/045 | (2023.01) |
| G06N 3/08 | (2023.01) |
| G06T 3/4046 | (2024.01) |
| G06T 5/70 | (2024.01) |
| G06T 7/11 | (2017.01) |
| G06V 30/262 | (2022.01) |

(52) U.S. Cl.
CPC ............... *G06T 5/70* (2024.01); *G06F 18/21* (2023.01); *G06N 3/045* (2023.01); *G06N 3/08* (2013.01); *G06T 3/4046* (2013.01); *G06T 7/11* (2017.01); *G06V 30/274* (2022.01); *G06T 2207/20084* (2013.01); *G06T 2207/30201* (2013.01)

(58) Field of Classification Search
CPC ........ G06N 3/0454; G06T 2207/30201; G06T 3/4046; G06T 5/002; G06T 5/005; G06T 2207/20084
See application file for complete search history.

(56) References Cited

U.S. PATENT DOCUMENTS 10,593,023 B2 * 3/2020 Chang ..................... G06N 3/02
11,335,122 B2 * 5/2022 Velusamy ................. G06T 5/20
(Continued)

OTHER PUBLICATIONS

Adobe Photoshop Fix "Powerful retouching. At a touch"; Date downloaded Oct. 19, 2020; https://www.adobe.com/products/fix.html.
(Continued)

*Primary Examiner* — Hadi Akhavannik
(74) *Attorney, Agent, or Firm* — Keller Preece PLLC

(57) ABSTRACT

The present disclosure relates to an image retouching system that automatically retouches digital images by accurately correcting face imperfections such as skin blemishes and redness. For instance, the image retouching system automatically retouches a digital image through separating digital images into multiple frequency layers, utilizing a separate corresponding neural network to apply frequency-specific corrections at various frequency layers, and combining the retouched frequency layers into a retouched digital image. As described herein, the image retouching system efficiently utilizes different neural networks to target and correct skin features specific to each frequency layer.

20 Claims, 11 Drawing Sheets

(56) References Cited

U.S. PATENT DOCUMENTS

| | | | |
|---|---|---|---|
| 2010/0177981 A1* | 7/2010 | Wang | G06T 7/11 |
| | | | 382/260 |
| 2017/0256084 A1* | 9/2017 | Iglehart | G06V 40/16 |
| 2019/0251674 A1* | 8/2019 | Chang | G06N 3/045 |
| 2020/0206486 A1* | 7/2020 | Edgar | G16H 50/20 |

OTHER PUBLICATIONS

Facetune.com "Every App You Need to Stand Out on Social Media"; Date downloaded Oct. 19, 2020; https://www.facetuneapp.com.

Photowonder Online "The best photo editing app for Android and PC"; Date downlodaded Oct. 19, 2020; http://photowonder-online.com.

PicMonkey; "Power your brand with photo editing and design"; Date downloaded Oct. 19, 2020; https://www.picmonkey.com.

Boyadzhiev et al. "Band-Sifting Decomposition for Image Based Material Editing"; Date downloaded Oct. 19, 2020; http://www.cs.cornell.edu/projects/band_sifting_filters/.

U.S. Appl. No. 17/072,372, Jul. 20, 2022, Notice of Allowance.

\* cited by examiner

| Input Images 802 | State-Of-The-Art Output Images 804 | Image Retouching System Output Images 806 |
|---|---|---|
|  |  |  |
|  |  |  |
|  |  |  |

1000

Separating An Image Into A High-Frequency Layer, A Mid-Frequency Layer, And A Low-Frequency Layer 1010

Utilizing A First Neural Network To Correct Skin Blemishes In The Mid-Frequency Layer 1020

Utilizing A Second Neural Network To Correct Skin Blemishes In Low-Frequency Layer 1030

Combining The Frequency Layers To Generate A Retouched Image 1040

RETOUCHING DIGITAL IMAGES UTILIZING LAYER SPECIFIC DEEP-LEARNING NEURAL NETWORKS

CROSS-REFERENCE TO RELATED APPLICATIONS

The present application is a continuation of U.S. application Ser. No. 17/072,372, filed on Oct. 16, 2020. The aforementioned application is hereby incorporated by reference in its entirety.

BACKGROUND

Recent years have seen a significant increase in digital image editing. Indeed, advances in both hardware and software have increased the ability of individuals to capture, create, and edit digital images. For instance, the hardware on most modern computing devices (e.g., smartphones, tablets, servers, desktops, and laptops) enables both professionals and hobbyists to perform a variety of digital image editing operations. Similarly, improvements in software enable individuals to modify, filter, or otherwise edit digital images across a variety of computing devices.

Notwithstanding these improvements in the field of digital image editing, conventional systems continue to suffer from a number of problems with regard to accuracy, efficiency, and flexibility of computing device operations, and in particular, with respect to skin retouching. For example, when performing image corrections, many conventional systems overcorrect digital images causing them to appear unnatural and unrealistic. As another example, various conventional systems perform inefficient operations, require a large number of computing resources, and take long periods of time to complete image editing tasks. Further, some conventional systems rigidly require input images to meet specified parameters, or else they are unable to apply corrections to the images.

Accordingly, these along with additional problems and issues exist in existing solutions with respect to the technical field of digital image editing.

BRIEF SUMMARY

Implementations of the present disclosure provide benefits and/or solve one or more of the foregoing or other problems in the art with systems, non-transitory computer-readable media, and methods that accurately and efficiently utilize separate deep-learning neural networks to automatically retouch digital images. For instance, in various implementations, the disclosed systems utilize multiple deep-learning neural networks to target and correct different types of skin features within different layers of a digital image. For example, the disclosed systems separate the digital image into layers that correspond to different skin features and utilize corresponding neural networks to correct skin features particular to a layer, such as skin blemishes in one layer and skin tones in another layer. In this manner, the disclosed systems efficiently pinpoint and correct skin features in a targeted manner. Further, in some implementations, the disclosed systems customize the amount of image correction applied to features of a particular layer based on user input.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
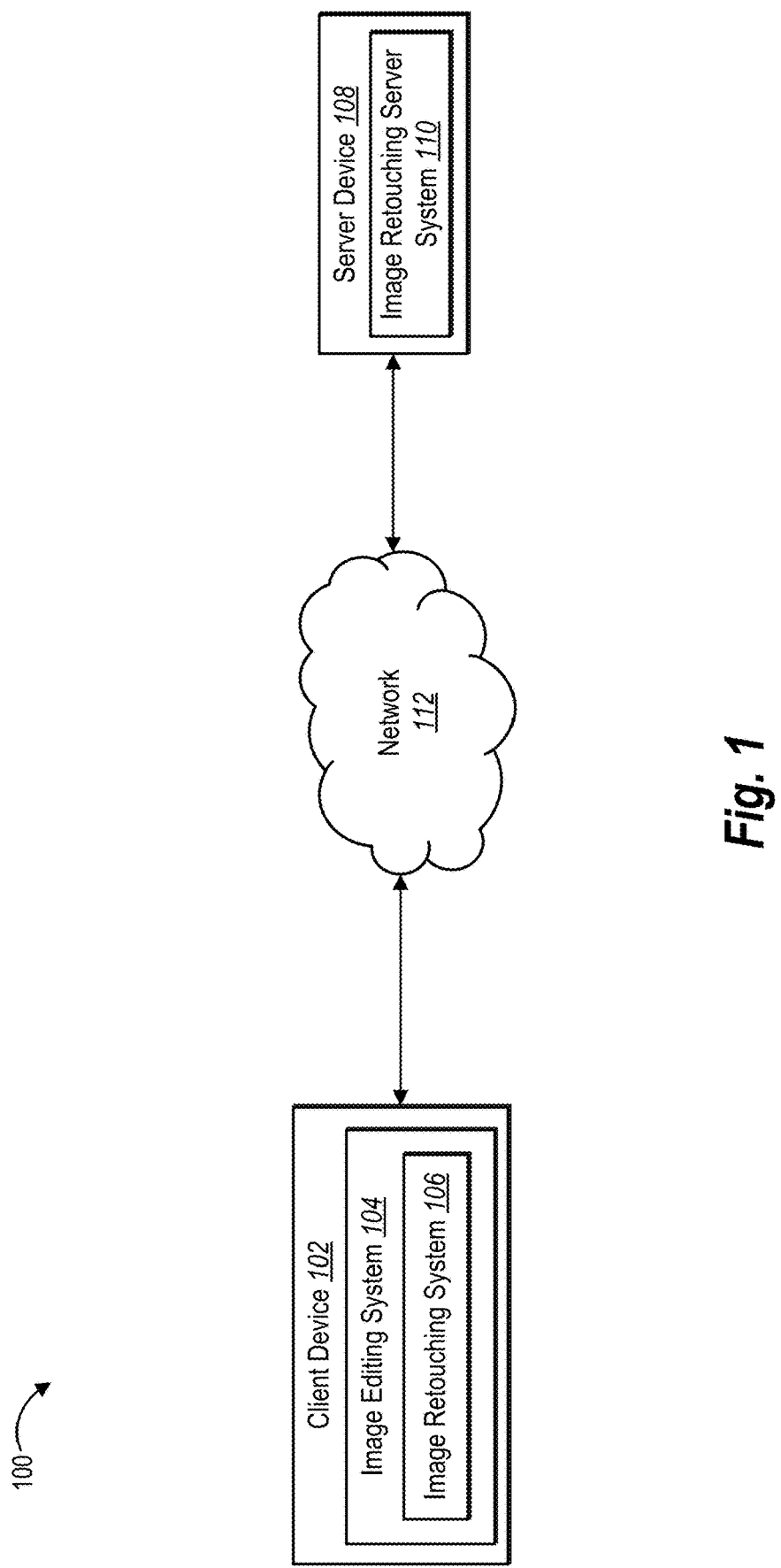
FIG. 1 illustrates a schematic diagram of a system environment in which an image retouching system operates in accordance with one or more implementations.

This disclosure describes one or more implementations of an image retouching system that automatically retouches digital images by accurately correcting blemishes and skin tones. Indeed, in many implementations, the image retouching system yields improved results of natural skin smoothing and color correction while retaining important skin textures and features. For instance, the image retouching system provides a framework for automatically retouching digital images by dividing a digital image into multiple layers, utilizing separate skin correction neural networks to apply frequency-specific corrections at each layer, and combining the corrected layers to generate a retouched digital image. More specifically, in one or more implementations, the image retouching system trains and utilizes different neural networks to target and correct skin features specific to each layer, such as smoothing skin blemishes in one layer and correcting skin tones in another layer.

To illustrate, in one or more implementations, the image retouching system separates a digital image (e.g., an image of a face) into multiple frequency layers, such as a high-frequency layer, a mid-frequency layer, and a low-frequency layer. Based on the mid-frequency layer, the image retouching system generates a modified mid-frequency layer utilizing a first neural network to correct skin blemishes in the mid-frequency layer. Additionally, using the low-frequency layer, the image retouching system generates a modified low-frequency layer utilizing a second neural network to correct skin blemishes in the low-frequency layer. Further, the image retouching system combines or reconstructs the frequency layers (e.g., the high-frequency layer, the modified mid-frequency layer, and the modified low-frequency layer) to generate a retouched or modified digital image of the face.

As mentioned above, the image retouching system automatically retouch faces in digital images. To elaborate, in various implementations, the image retouching system first detects a face in a digital image. For example, the image retouching system utilizes a face detector to isolate a face from other areas of the digital image and generate a face portrait image. In addition, the image retouching system generates a skin mask of the face that indicates skin-based portions of the face (e.g., skin, nose, ears, and neck) and non-skin-based portions of a face (e.g., mouth, eyes, and hair). As described below, in various implementations, the image retouching system utilizes a semantic segmentation network and a skin mask generator to create a segmentation mask and a skin mask of a face.

Additionally, the image retouching system separates the digital image into multiple frequencies, as mentioned above. For instance, the image retouching system separates the face portrait into different frequency layers corresponding to different skin features. For example, the image retouching system utilizes a frequency separator to generate a high-frequency layer, a mid-frequency layer, and a low-frequency layer.

Moreover, in one or more implementations, the image retouching system utilizes downsampling and/or convolutional smoothing to generate the different frequency layers (e.g., the mid-frequency layer and the low-frequency layer), as described below. In some implementations, the image retouching system utilizes bilinear filtering or other techniques to downsample the face portrait to predetermined fixed image sizes as part of generating various frequency layers. By utilizing fixed image sizes and resolutions, the image retouching system more efficiently handles and processes input images of arbitrary sizes.

In additional implementations, the image retouching system performs image corrections to portions of a frequency layer that include a higher amount of image smoothing. For example, the image retouching system smooths an image via downsampling and/or applying a convolution, then resizes the smoothed image to the original size via image interpolation. Further, in some implementations, the image retouching system compares the difference between the two image versions to determine the area in the image where the greatest amounts of smoothing occur for a given frequency. Indeed, the image retouching system determines a depth-wise separable convolution for various frequencies of the image, which is further described below.

As mentioned above, the image retouching system utilizes multiple deep-learning models to retouch a digital image. For instance, in some implementations, the image retouching system utilizes separate skin correction neural networks to correct different skin features of a face within a face portrait image. For example, in one or more implementations, the image retouching system trains a first skin correction neural network to smooth and correct skin blemishes, such as scars, freckles, acne, dark spots, oiliness, or large pores. Additionally, the image retouching system trains a separate skin correction neural network to correct skin tones and face colors, such as removing face redness.

In one or more implementations, the image retouching system trains the skin correction neural networks as separate deep-learning networks. While separate networks, the image retouching system utilizes a shared set of training images and similar actions to train the neural networks. For example, the training set includes original images and retouched images, which serve as a ground truth for training. Further, in various implementations, the image retouching system trains the two neural networks utilizing different reconstruction loss functions, as described below.

As mentioned above, in a number of implementations, the image retouching system utilizes the separate neural networks to provide targeted corrections to skin features. For example, in one or more implementations, the image retouching system utilizes the blemish smoothing neural network to correct skin blemishes from the mid-frequency layer (e.g., based on the mid-frequency band from applying depth-wise separable convolutions to the mid-frequency layer). In addition, in some implementations, the image retouching system utilizes the skin tone correction neural network to correct skin color within the low-frequency layer.

Further, as mentioned above, the image retouching system combines the frequency layers to generate a retouched digital image. For example, in one or more implementations, the image retouching system reconstructs the modified frequency layers and, in some cases, one or more unmodified frequency layers, to generate a reconstructed face portrait. In some implementations, as described below, the image retouching system utilizes a Laplacian formulation to reconstruct the digital image from a retouched mid-frequency band and a retouched low-frequency layer.

In various implementations, the image retouching system provides the retouched digital image to a client device with a graphical user interface. To illustrate, the image retouching system detects an input digital image, automatically retouches the digital image, and displays the retouched image. In some implementations, the image retouching system provides options for customizing image correction. For instance, in one or more implementations, the image retouching system provides selectable options to specify a magnitude or amount for applying corrections to each skin feature type. For example, the image retouching system utilizes user input to control the magnitude of blemish smoothing or skin tone correction, as further described below.

As mentioned above, conventional systems face a number of problems with regard to accuracy, efficiency, and flexibility of computing device operations in the field of digital image editing, and in particular, skin retouching. To illustrate, many conventional systems are inaccurate. For instance, as mentioned above, several conventional systems generate retouched digital images that are unsatisfactory. In particular, many conventional systems over smooth or over-correct digital images causing them to appear unnatural and unrealistic. For example, when retouching digital images, some conventional systems over smooth skin causing the skin to look plastic and cartoonish.

Moreover, many conventional systems trade-off between fixing one type of skin feature at the expense of fixing other skin feature types. For example, these conventional systems often sacrifice fixing skin blemishes at the expense of correcting face redness. Further, these conventional systems often soften or remove important features needed for identity recognition, such as facial hair stubble, wrinkle lines, and laugh lines.

Additionally, conventional systems are inaccurate. For instance, some conventional systems generate retouched images that are visually flawed. For example, while attempting to remove blemishes, these conventional systems inaccurately blend a modified area with surrounding areas, leaving artifacts and other visual cues that image edits have occurred. At times, the retouched area appears worse than the original blemish.

Further, several conventional systems are inefficient. To illustrate, many conventional systems utilize approaches that require large amounts of computing resources. As a result, image retouching operations performed by these systems suffer from time lag and processing delays. On the other hand, many conventional systems provide a range of tools for image correction, but they require users to manually retouch a digital image. Often, the steps needed to manually retouch a digital image are sophisticated and require a high level of skill and experience. Accordingly, not only are these conventional systems time consuming in manually applying image corrections, but they also require additional computing resources to process each of the manual steps. Indeed, even professional and experienced users require several minutes to retouch a face in a digital image using these systems.

In addition, numerous conventional systems are inflexible. For example, many conventional systems do not provide direct tools for skin retouching. Instead, individuals are left to use generic image editing tools or tools designated for different purposes. As a result, users are often attempting to smooth skin using tools not intended for skin smoothing, which create unsatisfactory results in many instances.

As another example, as mentioned above, many conventional systems require input images to meet specified parameters before skin corrections are applied. For example, some conventional systems have size constraints and cannot retouch larger images. Alternatively, some conventional systems retouch larger digital images, but sacrifice both accuracy and efficiency to do so.

As previously mentioned, the image retouching system provides numerous advantages and benefits over conventional systems. Indeed, in many implementations, the image retouching system improves both accuracy and efficiency. To illustrate, the image retouching system largely improves accuracy by retouching images realistically and naturally. In particular, by utilizing separate neural networks that target different skin features manifest in the different layers/frequencies of a digital image, the image retouching system corrects errors in digital images with improved precision and accuracy. For example, as mentioned above, in some implementations, the image retouching system separates a digital image into at least a low-frequency layer and a mid-frequency layer. The low-frequency layer generally includes skin tone information while the mid-frequency layer generally includes skin blemish information. Then, the image retouching system provides the mid-frequency layer to a blemish smoothing neural network and the low-frequency layer to a skin tone correction neural network. Each neural network targets and improves imperfect skin features corresponding to the respective input layers without erroneously modifying other skin features that do not need editing (as is the case with less precise conventional systems).

Further, in various implementations, the image retouching system combines the modified frequency layers with the high-frequency layer (e.g., a non-modified high-frequency layer). In many instances, the high-frequency layer includes skin features, such as pores and other skin texture details, that do not need modification, and which may be needed to ensure that the digital image retains a realistic look. Accordingly, by reconstructing the modified frequency layers with the high-frequency layer without retouching or modifying the high-frequency layer, the image retouching system generates a highly accurate retouched digital image.

In one or more implementations, the image retouching system improves efficiency over conventional systems. For example, because the image retouching system follows a framework that utilizes predetermined fixed image resolutions independent from the size of an input image, the image retouching system performs image correction operations at a constant speed and for a small set number of iterations regardless of the size of the input image. Furthermore, unlike conventional systems that use expensive operations to perform image smoothing (e.g., bilateral and Gaussian filters), the image retouching system utilizes simple linear operations. Indeed, in many implementations, the image retouching system need only perform two downsampling and upsampling linear operations, which are computationally simple, irrespective of the size of the input image.

Additionally, in various implementations, the image retouching system utilizes a backbone framework optimized to perform linear operations. For example, the image retouching system utilizes convolutional neural networks optimized for linear operations to perform image corrections on depth-wise separable convolutional differences within one or more frequency layers of a digital image. As a result of the above, the image retouching system commonly achieves efficiency and speed improvements up to 10 times faster for images of 2K (or larger) over state-of-the-art skin retouching systems.

Further, because the image retouching system follows a framework that utilizes predetermined fixed image resolutions, the image retouching system handles input images of arbitrary resolutions. Indeed, as mentioned above, the image retouching system flexibly accepts input images of various sizes, including very large images (e.g., 8K or larger) without increasing processing time, adding lag, or sacrificing image quality.

As another example of flexibility, the image retouching system individually adjusts image correction levels applied to specific features of a particular layer. For example, in various implementations, the image retouching system interacts with a user to determine what level of smoothing and image correction to apply to each of the separated frequency layers. Indeed, the image retouching system enables separate image smoothing and image correction controls to generate a customized retouched digital image.

Referring now to the figures, FIG. 1 illustrates a schematic diagram of a system environment 100 in which an image retouching system 106 operates in accordance with one or more implementations. As shown in FIG. 1, the system environment 100 (or simply "environment 100") includes a client device 102 and a server device connected via a network 112. Additional detail regarding these computing devices (e.g., the client device 102 and the server device 108) is provided below in connection with FIG. 11. Further, FIG. 11 also provides additional detail regarding networks, such as the illustrated network 112.

Although FIG. 1 illustrates a particular number, type, and arrangement of components within the environment 100, various additional environment configurations are possible. For example, the environment 100 includes any number of client devices. As another example, the server device 108 represents a set of connected server devices. As a further example, the client device 102 may communicate directly with the server device 108, bypassing the network 112 or utilizing a separate and/or an additional network.

As shown, the environment 100 includes the client device 102. In various implementations, the client device 102 is associated with a user (e.g., a user client device), such as a user that requests automatic retouching of an image. The client device 102 includes an image editing system 104 and an image retouching system 106. In various implementations, the image editing system 104 implements the image retouching system 106. In alternative implementations, the image retouching system 106 is separate from the image editing system 104. While the image editing system 104 and the image retouching system 106 are shown on the client device 102, in some implementations, the image editing system 104 and the image retouching system 106 are located remotely from the client device 102 (e.g., on the server device 108), as further explained below.

The image editing system 104, in general, facilitates the creation, modification, sharing, and/or deletion of digital images. For instance, the image editing system 104 provides a variety of tools related to image creation and editing (e.g., photo-editing). For example, the image editing system 104 provides selection tools, color correction tools, and image manipulation tools. Moreover, the image editing system 104 optionally operates in connection with one or more applications to generate or modify digital images. For example, in one or more implementations, the image editing system 104 operates in connection with digital design applications or other image editing applications.

In various implementations, a digital image (or simply "image") includes a digital graphics file that when rendered displays one or more objects. Often, an image includes one or more detectable faces. In various implementations, the image editing system 104 displays an image on a computing device, such as the client device 102. Additionally, in some implementations, an image includes one or more frames in a video or animation.

As mentioned above, the image editing system 104 includes the image retouching system 106. As described in detail below, the image retouching system 106 automatically retouches images to remove noise (e.g., blemishes) as well as correct color (e.g., skin tones). Additionally, while the image retouching system 106 is described in terms of retouching faces in images, the image retouching system 106 optionally also retouches other artifacts. For example, utilizing the implementations described below and variations thereof, the image retouching system 106 removes defects or correct noise from older images (e.g., scanned photos) while preserving important images details and colors.

As shown, the environment 100 also includes the server device 108. The server device 108 includes an image retouching server system 110. For example, in one or more implementations, the image retouching server system 110 represents and/or provides similar functionality as described herein in connection with the image retouching system 106. In some implementations, the image retouching server system 110 supports the image retouching system 106 on the client device 102. Indeed, in one or more implementations, the server device 108 includes all, or a portion of, the image retouching system 106. In particular, the image retouching system 106 on the client device 102 downloads an application from the server device 108 (e.g., an image editing application from the image retouching server system 110) or a portion of a software application.

In some implementations, the image retouching server system 110 includes a web hosting application that allows the client device 102 to interact with content and services hosted on the server device 108. To illustrate, in one or more implementations, the client device 102 accesses a web page supported by the server device 108, which hosts the models that allow for automatic retouching of images. As another example, the client device 102 (e.g., a mobile device) includes an image editing application that provides a digital image to the image retouching server system 110 on the server device 108, which automatically retouches the images.

Figure 2:
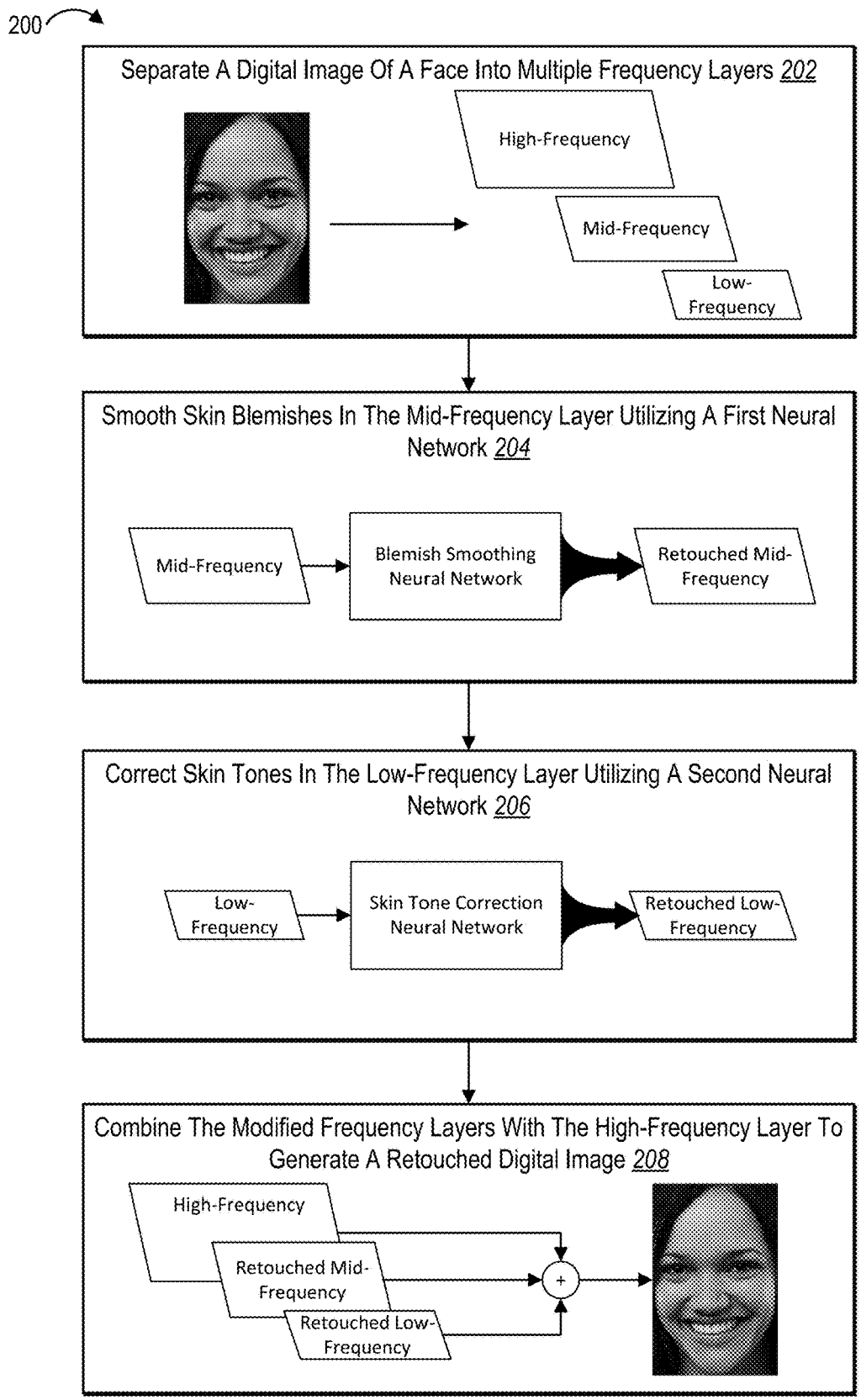
FIG. 2 illustrates an overview diagram of automatically retouching a digital image utilizing the image retouching system in accordance with one or more implementations.

Turning to the next figure, FIG. 2 provides an overview of utilizing the image retouching system to automatically retouch images. In particular, FIG. 2 illustrates a series of acts 200 of automatically retouching a digital image utilizing the image retouching system in accordance with one or more implementations. For example, in various implementations, the image retouching system 106 performs the series of acts 200. In some implementations, an image editing system and/or image editing application performs one or more of the acts included in the series of acts 200.

As shown in FIG. 2, the series of acts 200 includes an act 202 of separating a digital image of a face into multiple frequency layers. As shown, the image retouching system 106 separates an image into a high-frequency layer, a mid-frequency layer, and a low-frequency layer. In some instances, the image retouching system 106 utilizes a frequency separator to extract multiple frequency layers from an image. Additional detail regarding separating frequency layers is described below with respect to FIG. 5.

As shown, the series of acts 200 includes an act 204 of smoothing skin blemishes in the mid-frequency layer utilizing a first neural network. For instance, in one or more implementations, the image retouching system 106 trains or otherwise obtains a neural network that smooths skin blemishes in images. For example, the image retouching system 106 provides the mid-frequency layer, which generally includes the majority of skin blemishes from an image without including finer skin details or other skin features such as skin tones, to a blemish smoothing neural network. Then, as illustrated, the blemish smoothing neural network generates a retouched mid-frequency layer that smooths and minimizes skin blemishes from the mid-frequency layer. Additional detail regarding training and utilizing a blemish smoothing neural network is described below with respect to FIG. 6.

As shown, the series of acts 200 includes an act 206 of correcting skin tones in the low-frequency layer utilizing a second neural network. For instance, in one or more implementations, the image retouching system 106 trains or otherwise obtains a neural network that corrects skin tones or larger skin blemishes. For example, the image retouching system 106 provides the low-frequency layer, which generally includes larger skin features and colors, such as skin redness, to a skin tone correction neural network. Then, as illustrated, the skin tone correction neural network generates a retouched low-frequency layer that removes redness and otherwise corrects color and larger skin blemishes from the low-frequency layer. Additional detail regarding training and utilizing a skin tone correction neural network is described below with respect to FIG. 6.

As shown, the series of acts 200 includes an act 208 of combining the modified frequency layers with the high-frequency layer to generate a retouched digital image. For example, in one or more implementations, the image retouching system 106 reconstructs the digital image utilizing the modified mid-frequency layer and the modified low-frequency layer along with the original (or in some embodiments modified) high-frequency layer to generate a retouched image. In this manner, the image retouching system 106 generates a retouched image that includes the smoothing and corrections from multiple separate neural networks. Additional detail regarding combining the multiple frequency layers is described below with respect to FIG. 3.

Figure 3:
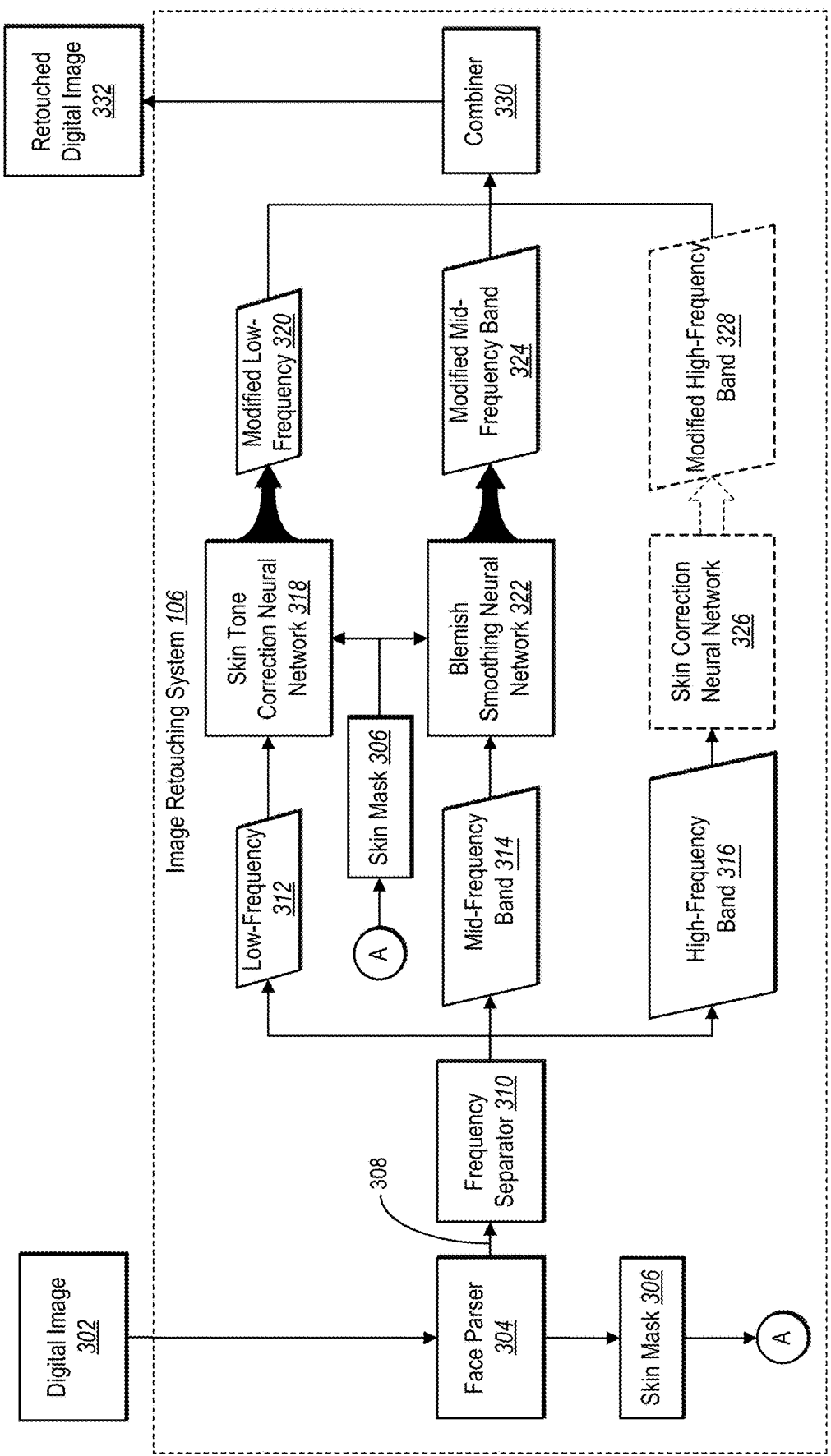
FIG. 3 illustrates a framework for automatically retouching a digital image by applying image corrections to separate layers of the digital image in accordance with one or more implementations.

Advancing to the next figure, FIG. 3 illustrates a framework of the image retouching system 106 for automatically retouching a digital image by applying image corrections to separate frequency layers of the digital image in accordance with one or more implementations. As shown, the image retouching system 106 receives a digital image 302 (or simply "image 302") and generates a retouched digital image 332 (or simply "retouched image 332"). Indeed, as shown in FIG. 3, the image retouching system 106 includes various components and elements that are utilized to generate the retouched image 332.

In one or more implementations, the image retouching system 106 receives the image 302 from a user. For example, the image retouching system 106 is part of, or communicates with, an image editing application to access and display the image 302. In these implementations, the image retouching system 106 detects a user request (e.g., via a tool of the image editing application) for the image 302 to be automatically retouched.

Figure 4:
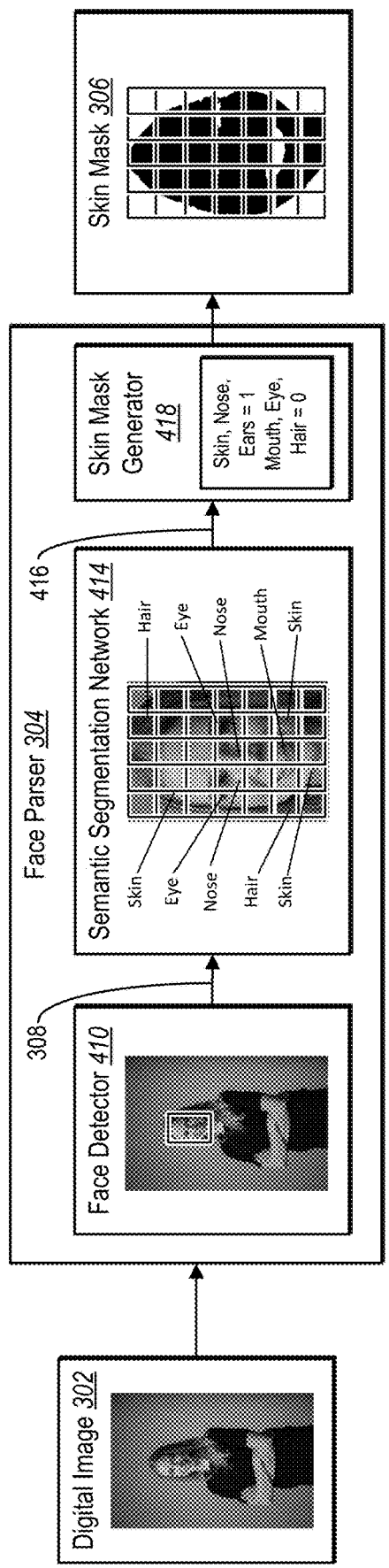
FIG. 4 illustrates a block diagram of a face parser in accordance with one or more implementations.

As shown in FIG. 3, the image retouching system 106 includes a face parser 304. In various implementations, the face parser 304 detects a face in the image 302 and generate a skin mask 306 from the image 302. For example, as shown, the face parser 304 outputs a face portrait image 308 (or simply "face portrait 308") to a frequency separator 310. In addition, as shown, the face parser 304 generates and provides a skin mask 306 to multiple neural networks, which is further described below. Indeed, FIG. 4 provides additional detail below regarding operations and functions of the face parser 304 including generating skin masks.

As mentioned above, the face parser 304 generates a skin mask 306. In general, a skin mask indicates skin-based features. For example, a skin mask indicates areas of an image to analyze for potential retouching and areas of the image to remove (i.e., filter out). Often, a skin mask is a pixilated image that includes a positive value (i.e., 1) for pixels in the skin mask representing skin portions in an image and a null value (i.e., 0) for pixels representing non-skin portions in the image (or vice-versa).

As shown, the image retouching system 106 includes a frequency separator 310. In various implementations, the frequency separator 310 extracts or otherwise separates the image 302 into multiple frequency layers. For example, in one or more implementations, the frequency separator 310 generates a low-frequency layer 312, a mid-frequency layer, and a high-frequency layer. While this disclosure generally describes the frequency separator 310 as separating a digital image into three frequency layers, in other implementations, the frequency separator 310 extracts additional layers from a digital image.

For context, frequency layers include different portions of a digital image. For instance, in some implementations, different frequency layers of an image capture different types of skin features. For example, a high-frequency layer includes detailed skin features, such as small pores and fine skin texture details. A mid-frequency layer includes coarse skin features and details, such as skin blemishes (e.g., acne, dark spots, freckles, and scars) and larger pores. A low-frequency layer includes larger skin features, such as skin tones, color, shading, and shadow information. In various implementations, the frequency layers vary in size and resolution (including fixed or predetermined resolutions).

In various implementations, in addition to generating multiple frequency layers, the frequency separator 310 determines differences between initial and convoluted versions of a frequency layer. Indeed, the frequency separator 310 determines and identifies where key skin features corresponding to a frequency layer reside. As shown in FIG. 3, the frequency separator 310 outputs the low-frequency layer 312, a mid-frequency band 314 (e.g., based on a mid-frequency layer), and a high-frequency band 316. Additional detail regarding functions and operations of the frequency separator 310 as well as generating the multiple frequency layers are provided below with respect to FIG. 5.

For context, a frequency band represents a depth-wise separable convolution that identifies where key skin features corresponding to a frequency layer reside. For instance, a frequency band is the result of comparing two versions of a frequency layer (e.g., where the two versions have different depths as a result of convolutions). To illustrate, the image retouching system 106 compares a first version of a mid-frequency layer with a second version of the mid-frequency layer that has been processed by scaling and convoluting to determine a frequency band. The image retouching system 106 indicates the results of the comparison in a depth-wise separable convolution image that shows where the two versions differ. In many implementations, the image retouching system utilizes the frequency band (e.g., from the depth-wise separable convolution) rather than the one or more versions of the frequency layer as the frequency band is smaller and results in significantly faster processor times. Further, the image retouching system 106 utilizes processes such as Laplacian formulations with the frequency bands to modify and reconstruct a retouched image, as further described below.

Additionally, in the context of digital image processing, convolution includes modifying elements or pixels in an image according to a pattern or algorithm. For example, the image retouching system 106 performs a convolution by modifying a pixel in an image based on the values of its local neighbors and an applied weighed kernel, where the weighted kernel includes a matrix used to perform blurring, sharpening, or other image editing operations. Examples of convolutional functions include bilinear (e.g., utilizing a bilinear kernel), bicubic, nearest neighbor, bilateral, Gaussian, etc.

In addition, convolution often occurs in connection with downsampling or upsampling. In general, downsampling and upsampling images of layers include dimensionality scaling an image, such as making the image smaller (e.g., downsampling) or larger (e.g., upsampling). When downsampling, the image retouching system 106 applies a convolutional filtering operation where pixels are removed from a higher resolution image (or layer) to a lower resolution image. Likewise, when upsampling the image retouching system 106 applies a convolutional interpolation operation where pixels are added to a higher resolution image (or layer) based on pixels in a corresponding lower resolution image.

Returning to FIG. 3, as shown, the image retouching system 106 includes a skin tone correction neural network 318. As mentioned above, in various implementations, the skin tone correction neural network 318 enhances or fixes larger skin features (e.g., skin color, shadowing, or shading) from input images. As shown, the skin tone correction neural network 318 generates a modified low-frequency layer 320 that retouches skin tones from the low-frequency layer 312. Indeed, the skin tone correction neural network 318 removes skin blemishes in low-frequencies, such as removing skin redness for areas surrounding blemishes. Additional detail regarding generating, training, and utilizing a skin tone correction neural network is provided below with respect to FIG. 6.

By way of context, machine-learning models include algorithms that model high-level abstractions in data by generating data-driven predictions or decisions from the known input data. Examples of machine-learning models include computer representations that are tunable (e.g., trainable) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include latent Dirichlet allocation (LDA), multi-arm bandits models, linear regression models, logistical regression models, random forest models, support vector machines (SVG) models, neural networks (convolutional neural networks, recurrent neural networks such as LSTMs, graph neural networks, etc.), or decision tree models.

Further, a neural network includes a machine learning model having interconnected artificial neurons that communicate and learn to approximate complex functions and generate outputs based on a plurality of inputs provided to the model. For instance, a neural network includes an algorithm (or set of algorithms) that implements deep learning techniques that utilize a set of algorithms to model high-level abstractions in data using training data to tune parameters of the neural network. Examples of neural networks include a convolutional neural network (CNN), residual learning neural network, recurrent neural network (RNN), generative adversarial neural network (GAN), and single-shot detect (SSD) networks.

Returning to FIG. 3, as shown, the image retouching system 106 provides the skin mask 306 to the skin tone correction neural network 318. In various implementations, the skin tone correction neural network 318 utilizes the skin mask 306 to determine areas within the low-frequency layer to retouch and repair. In some implementations, the image retouching system 106 first downsamples the skin mask 306 to match the resolution of the low-frequency layer 312 before providing it to the skin tone correction neural network 318. In alternative implementations, the skin tone correction neural network 318 maps the skin mask 306 to the resolution of the low-frequency layer 312.

As shown, the skin tone correction neural network 318 processes the low-frequency layer 312, rather than a low-frequency band. Indeed, because the low-frequency layer 312 is often the lowest resolution of the frequency layers, the low-frequency layer serves as the base layer from which higher layers are generated. Accordingly, the low-frequency layer 312 is provided to the skin tone correction neural network 318 as opposed to a corresponding depth-wise separable convolution.

Moreover, as shown in FIG. 3, the image retouching system 106 includes a blemish smoothing neural network 322. In various implementations, the blemish smoothing neural network 322 softens, removes, and/or minimizes skin blemishes from images. In general, skin blemishes include skin features that are editable to improve the visual appearance of a digital image. Examples of skin blemishes include scars, freckles, acne, dark spots, oiliness, or large pores. In some instances, skin blemishes are broadly used to include imperfections captured in mid-frequency layers, such as imperfections in skin tone, color, shading, and/or shadow information (e.g., the redness around acne or lighter skin of a scar). Indeed, skin blemishes generally refer to skin imperfections or other features on an image that the image retouching system retouches, smooths, and/or corrects to improve the aesthetics of the image.

As shown, the blemish smoothing neural network 322 generates a modified mid-frequency band 324 from the mid-frequency band 314. For example, the modified mid-frequency band 324 includes edits and modifications that retouch (e.g., smooth, minimize, remove, fade, blend) skin blemishes from the mid-frequency band 314.

As mentioned above, in various implementations, by utilizing the frequency bands (e.g., from depth-wise separable convolutions) rather than frequency layers, the image retouching system 106 significantly increases the processing speed (e.g., up to 10× faster) when smoothing frequency layers of an image. Accordingly, as shown, the image retouching system 106 utilizes the blemish smoothing neural network 322 to generate the modified mid-frequency band 324 from the mid-frequency band 314. Additional detail regarding generating, training, and utilizing a blemish smoothing neural network is provided below with respect to FIG. 6.

As mentioned above, FIG. 3 includes a high-frequency band 316. As previously described, the high-frequency layer includes skin features with higher granularity, such as skin pores and skin texture details. Likewise, the high-frequency band 316 captures these finer skin features from performing depth-wise separable convolutions. While FIG. 3 shows the high-frequency band 316, in some implementations, the image retouching system 106 utilizes a high-frequency layer instead of the high-frequency band 316.

As mentioned above, when retouching an image, removing the finer skin features often results in unrealistic images (e.g., plastic-looking faces) and causes unintended problems, such as interfering with identity recognition. Accordingly, in many implementations, the image retouching system 106 does not modify or change the high-frequency layer and/or high-frequency band 316.

In alternative implementations, the image retouching system 106 modifies the high-frequency band 316. For example, the image retouching system 106 utilizes an optional skin correction neural network 326 similar to the blemish smoothing neural network 322 to remove skin blemishes and generate an optional modified high-frequency band 328. One or more examples of modifying a high-frequency layer are provided in U.S. Pat. No. 10,593,023, "Deep-Learning Based Automatic Skin Retouching," filed on Feb. 13, 2018, which is hereby incorporated by reference in its entirety.

As shown in FIG. 3, the image retouching system 106 includes a combiner 330. In various implementations, the combiner 330 aggregates the frequency layers to generate the retouched digital image 332 (or simply "retouched image 332"). In some implementations, the combiner 330 uses the frequency bands to reconstruct the retouched image 332.

To illustrate, FIG. 3 shows the image retouching system 106 providing the modified low-frequency layer 320, the modified mid-frequency band 324, and the high-frequency band 316 (or the optional modified high-frequency band 328) to the combiner 330. Using the modified low-frequency layer 320 as a base layer, the combiner 330 generates a modified mid-frequency layer from the modified mid-frequency band 324 (e.g., utilizing interpolation operations as described above). Further, the combiner 330 utilizes the high-frequency band 316 (or modified high-frequency band 328) and the modified mid-frequency layer to generate the retouched image 332. In various implementations, the combiner 330 (i.e., the image retouching system 106) utilizes a Laplacian formulation or a similar approach to generate the retouched image 332 from the frequency bands.

As mentioned above, FIG. 4 provides additional detail regarding the operations and functions of a face parser. To illustrate, FIG. 4 shows a block diagram of a face parser 304 in accordance with one or more implementations. As illustrated in FIG. 4, the face parser 304 generates the skin mask 306 from the digital image 302. In various implementations, as part of generating the skin mask 306, the face parser 304 utilizes various components. For example, as shown, the face parser 304 includes a face detector 410, a semantic segmentation network 414, and a skin mask generator 418.

The face detector 410 identifies one or more faces within the image 302. For example, in one or more implementations, the face detector 410 utilizes a face detection machine-learning model to identify a face within the image 302. In some implementations, as part of detecting a face, the face detector 410 generates a bounding box around the detected face within the image 302 (as illustrated). Further, in one or more implementations, the face detector 410 utilizes the bounding box to crop the image 302 and generate a face portrait 308 (i.e., a face portrait image) of only the detected face. In alternative implementations, the face detector 410 generates a face portrait mask that isolates the detected face from the image 302 without generating a new cropped face portrait image.

As shown, the face detector 410 provides the face portrait 308 to the semantic segmentation network 414. In alternative implementations, the face detector 410 otherwise indicates the detected face in the image 302 (e.g., with a face portrait mask) to the semantic segmentation network 414. In various implementations, a semantic segmentation network is a machine-learning model that associates pixels in an image with class labels. Additionally, given the context of face portraits, a semantic segmentation network associates pixels to various face labels.

To illustrate, the semantic segmentation network 414 assigns each pixel in the face portrait 308 to a face label. Examples of face labels include a skin label, a nose label, an eye label, a brow label, an ear label, a mouth label, a lip label, a neck label, and a hair label. Additional face labels include elements commonly included in face portraits, such as a hat label, a clothing label, an earring label, a nose stud label, or an accessories label. In some implementations, face labels are more granular, such as a right ear label, a lower lip label, a left eye label, an iris label, or a teeth label.

As mentioned, the semantic segmentation network 414 associates pixels in the face portrait 308 with face labels. As shown, the semantic segmentation network 414, in one or more implementations, generates a segmentation mask 416 where each pixel is labeled with a face label. Indeed, in some implementations, the semantic segmentation network 414 utilizes machine-learning to convert the face portrait 308 into a segmentation mask 416 by classifying and labeling each pixel with a skin label. In many implementations, the segmentation mask 416 matches the resolution of the face portrait 308.

As shown, the semantic segmentation network 414 provides the segmentation mask 416 to the skin mask generator 418. The skin mask generator 418 generates a skin mask 306 from the segmentation mask 416. For example, in one or more implementations, the skin mask generator 418 creates a mask having the same resolution as the segmentation mask 416. In this manner, the skin mask 306 shares the same resolution as the face portrait 308.

Further, in one or more implementations, the skin mask generator 418 creates the skin mask 306 by assigning a first value (e.g., a binary value of 1) to pixels labeled with a first set of face labels and a second value (e.g., a binary value of 0) to the remaining pixels. For instance, in various implementations, the skin mask generator 418 assigns pixels with skin-based features to the first value. For example, the skin mask generator 418 assigns pixels labeled as skin, nose, ear, or neck to a value of one (i.e., 1) assigning or leaving the remaining pixels as signed to a value of zero (i.e., 0). In alternative implementations, the skin mask generator 418 assigns pixels having non-skin-based features to the value of zero, such as pixels with the face labels of eye, brow, mouth, lip, hair, hat, or cloth.

In various implementations, the skin mask 306 indicates areas of a face that suitable for smoothing and/or correcting. Further, the skin mask 306 indicates areas of a face where corrections and smoothing should not be applied. Indeed, in one or more embodiments, the image retouching system 106 does not smooth areas such as eyes, lips, hair, clothing, and accessories. Accordingly, as mentioned above, in one or more implementations, the image retouching system 106 provides the skin mask 306 to the deep-learning neural networks to assist in smoothing and correcting to proper skin areas of the image 302 or face portrait 308.

Additionally, FIG. 3 and the identified corresponding text describe various implementations of utilizing skin correction neural networks to automatically retouch a digital image. Accordingly, the actions and algorithms described in connection with at least FIG. 3, as well as the other figures referred to therein, provide example structure, architecture, and actions for performing a step for retouching the plurality of frequency layers to correct skin blemishes. Indeed, the block diagram described in connection with FIG. 3 provides structure and actions for one or more of the algorithms corresponding to the image retouching system 106 correcting skin blemishes utilizing one or more skin correction neural networks.

While FIG. 4 provides one or more implementations for generating a skin mask from a digital image of a face, other approaches are possible. For example, the image retouching system 106 utilizes a face parser neural network that generates a skin mask directly form an input image. As another example, the face parser 304 includes additional, fewer, or different elements and actions for generating the skin mask 306.

Figure 5:
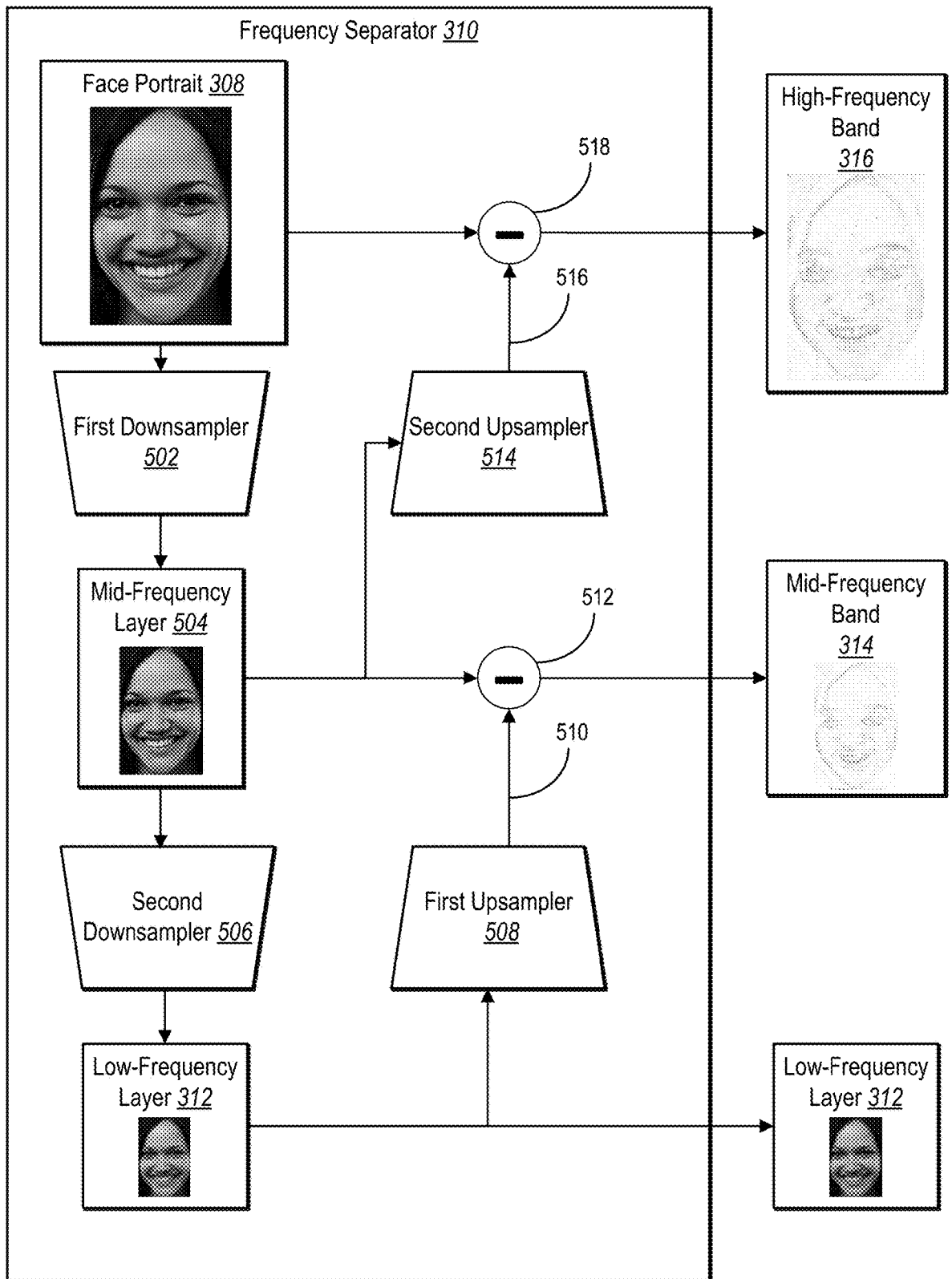
FIG. 5 illustrates a block diagram of a frequency separator in accordance with one or more implementations.

As mentioned above, FIG. 5 provides additional detail regarding separating an image into frequency layers. To illustrate, FIG. 5 shows a block diagram of a frequency separator 310 in accordance with one or more implementations. As described above with respect to FIG. 3, in one or more implementations, the image retouching system 106 provides the face portrait 308 to the frequency separator 310. Further, the frequency separator 310 generates multiple frequency layers of the face portrait 308. Accordingly, FIG. 5 shows the frequency separator 310 generating a high-frequency band 316, a mid-frequency band 314, and a low-frequency layer 312. In alternative implementations, the image retouching system 106 provides the digital image 302 to the frequency separator 310, which generates multiple frequency layers of the digital image 302.

As shown in FIG. 5, the frequency separator 310 includes a first downsampler 502, a second downsampler 506, a first upsampler 508, a second upsampler 514, a first differentiator 512, and a second differentiator 518. Each of the components is further described below. As illustrated, the frequency separator 310 utilizes the first downsampler 502 to generate a mid-frequency layer 504 of the face portrait 308. For example, the first downsampler 502 reduces the face portrait 308 to a first fixed or predetermined resolution. In one or more implementations, the first fixed resolution is 512 (e.g., 512×512) or a fixed aspect ratio of the face portrait 308 where the larger dimension is 512 pixels. In alternative implementations, the first fixed resolution is another predetermined resolution. In general, the smaller the first fixed resolution, the greater the amount of smoothing that will occur.

As mentioned above, by utilizing a fixed resolution, the image retouching system 106 achieves improvements in efficiency and flexibility. For example, some conventional systems downsize an input image by reducing the image size in half until the image is below a threshold resolution. Depending on the size of the input image (e.g., for 2K, 4K, or 8K images), this process could take multiple iterations. Further, while the final downsized image falls below the threshold resolution, it often is an arbitrary size. In contrast, the image retouching system 106 accepts input images of any resolution and performs a simple single operation to downsize the input image to a uniform size. Indeed, the first downsampler 502 downsamples the image to the fixed resolution irrespective of the original dimensions of the face portrait 308, even if they are arbitrary.

As mentioned above, the first downsampler 502 optionally utilizes a bilinear kernel to convolute the face portrait 308. For example, in one or more implementations, the first downsampler 502 utilizes bilinear filtering to reduce the face portrait 308 to the first fixed resolution (e.g., 512 pixels) to generate the mid-frequency layer 504. In various implementations, the first downsampler 502 follows the algorithm of P_mid=downsample(P, 512, 512, bilinear), where P represents a face portrait, 512 and 512 represent the width and height of the output image (i.e., P_mid) respectively, "bilinear" represents downsampling using a bilinear filtering operation, and P_mid represents the mid-frequency layer 504.

As shown in FIG. 5, the frequency separator 310 utilizes the second downsampler 506 to generate a low-frequency layer 312. For example, the second downsampler 506 reduces the mid-frequency layer 504 to a second fixed resolution. In one or more implementations, the second fixed resolution is 64 pixels (e.g., 64×64) or the fixed aspect ratio of the mid-frequency layer 504 where the larger dimension is 64 pixels. As with the first fixed resolution, the second resolution optionally is set to another predetermined size. Additionally, in alternative implementations, the second downsampler 506 generates the low-frequency layer 312 by downsampling the face portrait 308 directly.

In various implementations, the second downsampler 506 utilizes a bilinear kernel to convolute the mid-frequency layer 504. For example, the second downsampler 506 follows the equation of P_low=downsample(P_mid, 64, 64, bilinear), where P_mid represents a mid-frequency layer, 64 and 64 represent the width and height of the output image (i.e., P_low) respectively, "bilinear" represents downsampling using a bilinear filtering operation, and Plow represents the low-frequency layer 312. As indicated previously, the frequency separator 310 utilizes other convolutional operations to downscale images.

As shown, FIG. 5 includes the frequency separator 310 outputting the low-frequency layer 312. In addition, the frequency separator 310 also utilizes the low-frequency layer 312 to determine a depth-wise separable convolution. To illustrate, in one or more implementations, the frequency separator 310 provides the low-frequency layer 312 to the first upsampler 508. The first upsampler 508 upsamples the low-frequency layer 312 from the second fixed resolution to the first fixed resolution to generate a modified mid-frequency layer 510. For instance, based on the examples provided above, the first upsampler 508 generates a 512×512 pixel modified mid-frequency layer from a 64×64 pixel low-frequency layer.

In some implementations, the modified mid-frequency layer 510 represents a smoothed version of the mid-frequency layer 504. For instance, downsampling the mid-frequency layer 504 to the low-frequency layer 312 causes details (e.g., skin features) to filter out. For example, many skin blemishes, such as scars, freckles, acne, dark spots, oiliness, or large pores are smoothed out between the mid-frequency layer 504 and the low-frequency layer 312. Then, upon upsampling, the first upsampler 508 interpolates pixels from the lower-detailed low-frequency layer 312 to generate a modified mid-frequency layer 510 that amplifies the smoothed and filtered out skin features. Indeed, because the low-frequency layer 312 smooths out skin blemishes, these blemishes remain smoothed out in the modified mid-frequency layer 510.

In one or more implementations, the first upsampler 508 utilizes a bilinear kernel to generate the modified mid-frequency layer 510. For example, the first upsampler 508 performs bilinear interpolation to generate the modified mid-frequency layer 510 from the low-frequency layer 312. In some implementations, the first upsampler 508 follows the equation of M_mid=upsample(P_low, 512, 512, bilinear), where Plow represents a low-frequency layer, 512 and 512 represent the width and height of the output image (i.e., M_mid) respectively, "bilinear" represents upsampling using a bilinear interpolation operation, and M_mid represents the modified mid-frequency layer 510.

Further, as shown in FIG. 5, the frequency separator 310 generates a mid-frequency band 314. As shown, the frequency separator 310 utilizes the first differentiator 512 to compare the mid-frequency layer 504 and the modified mid-frequency layer 510. For example, the first differentiator 512 determines pixel changes or differences between the mid-frequency layer 504 and the modified mid-frequency layer 510 based on an equation of F_mid=P_mid−M_mid, where F_mid represents the modified mid-frequency layer 510. As mentioned above, these differences indicate areas in the mid-frequency layer 504 where skin features have been smoothed or changed. Stated differently, the mid-frequency band 314 provides a depth-wise separable convolution comparison indicating areas in the mid-frequency layer 504 where skin blemishes may reside.

In some implementations, the mid-frequency band 314 is an image that shows areas (e.g., by marking pixels) that differ between the mid-frequency layer 504 and the modified mid-frequency layer 510. In various implementations, the mid-frequency band 314 is set to the first fixed dimension (e.g., 512×512) to match the size of the mid-frequency layer 504 and the modified mid-frequency layer 510. In alternative implementations, the mid-frequency band 314 is a table or mapping that lists pixel coordinates of pixels that differ between the mid-frequency layer 504 and the modified mid-frequency layer 510.

As also shown, following a similar process, the frequency separator 310 generates a high-frequency band 316 by comparing an upsampled mid-frequency layer 504 with the face portrait 308 (or a high-frequency layer). To illustrate, in various implementations, the frequency separator 310 utilizes the second upsampler 514 to upsample the mid-frequency layer 504 to a modified high-frequency layer 516.

For example, the second upsampler 514 upsamples the mid-frequency layer 504 to match the original dimensionality of the face portrait 308.

In one or more implementations, the second upsampler 514 utilizes a bilinear kernel (e.g., bilinear interpolation) to generate the modified high-frequency layer 516. In some implementations, the second upsampler 514 follows the equation of M_high=upsample(P_mid, W, H, bilinear), where P_mid represents the mid-frequency layer 504, W and H represent the width and height of the output image (i.e., M_high) respectively to match those of the face portrait 308, "bilinear" represents upsampling using a bilinear interpolation operation, and M_high represents the modified high-frequency layer 516.

In some implementations, the frequency separator 310 generates the modified high-frequency layer 516 from the modified mid-frequency layer 510. For example, in these implementations, the second upsampler 514 follows the equation of M_high=upsample(M_mid, W, H, bilinear), where M_mid represents the modified mid-frequency layer 510, and W, H, "bilinear," and M_high are represented as described above.

Further, as shown in FIG. 5, the frequency separator 310 generates a high-frequency band 316. As shown, the frequency separator 310 utilizes the second differentiator 518 to compare the face portrait 308 (e.g., a high-frequency layer) and the modified high-frequency layer 516. In this manner, the second differentiator 518 determines pixel changes or differences corresponding to finer skin features and skin textures, for example, based on an equation of F_high=P_high−M_high, where F_high represents the modified high-frequency band 316. Accordingly, in various implementations, the high-frequency band 316 provides a depth-wise separable convolution comparison indicating areas in the face portrait 308 where skin textures and detailed skin features may reside.

As shown, in various implementations, the frequency separator 310 utilizes a Laplacian pyramid approach to generate the frequency bands. Similar to the structure shown in the frequency separator 310, a Laplacian pyramid decomposes an image onto a base image layer, and higher bands. Further, utilizing a Laplacian formulation, the image retouching system 106 reconstructs retouched frequency bands into the retouched image.

Additionally, FIG. 5 and the identified corresponding text describe various implementations of separating a digital image (e.g., a face portrait 308) into multiple frequency layers. Accordingly, the actions and algorithms described in connection with at least FIG. 5, as well as the other figures referred to therein, provide example structure, architecture, and actions for performing a step for generating a plurality of frequency layers from the digital image. Indeed, the diagram described in connection with FIG. 5 and the corresponding equations provide structure and actions for one or more of the algorithms corresponding to the image retouching system 106 for determining multiple frequency layers from a face portrait.

Figure 6:
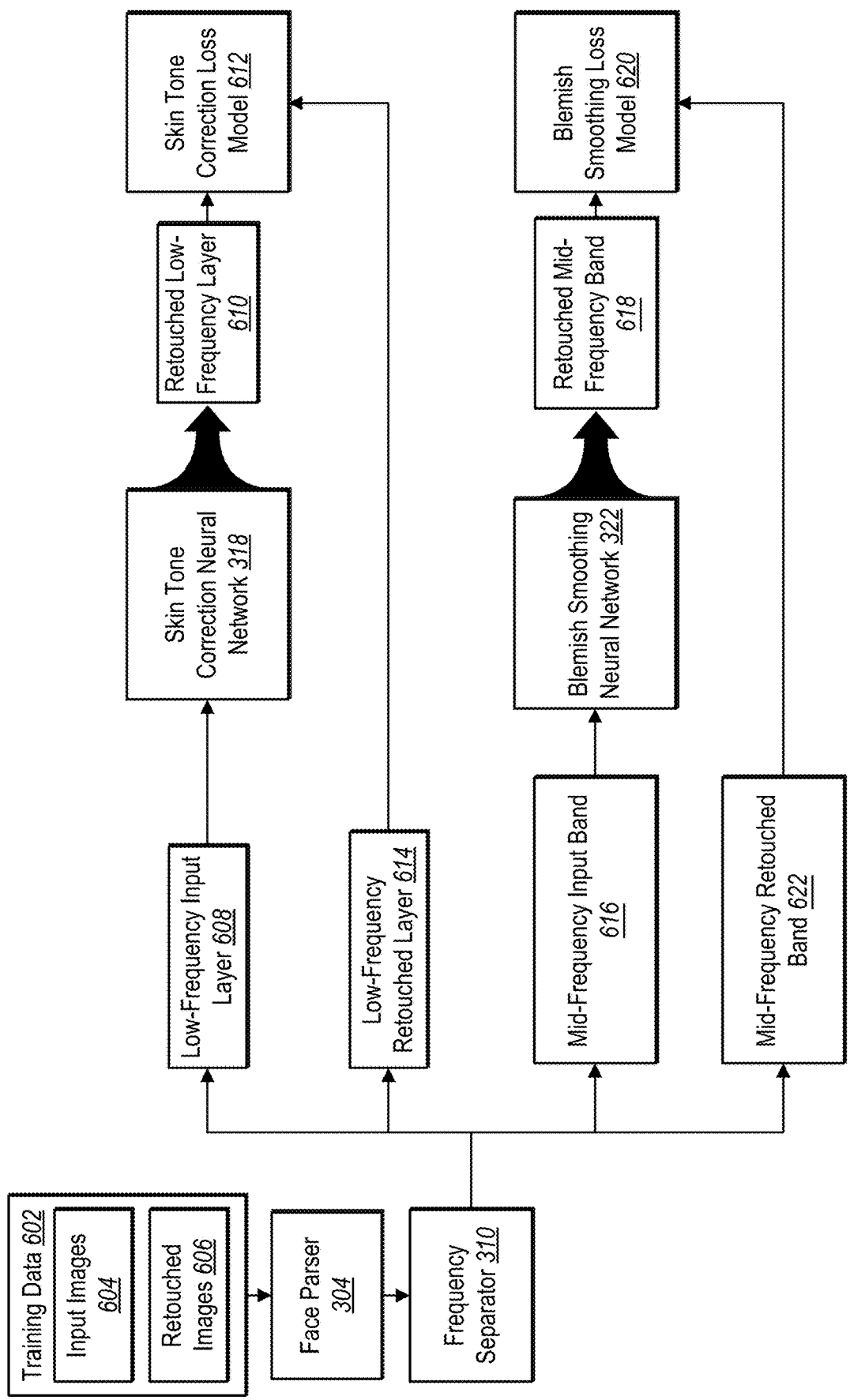
FIG. 6 illustrates a block diagram of training separate skin correction neural networks from a common training set in accordance with one or more implementations.

Turning now to FIG. 6, additional detail regarding training and utilizing skin correction neural networks is provided. To illustrate, FIG. 6 shows a block diagram of training multiple skin correction neural networks from a common training set in accordance with one or more implementations. For example, FIG. 6 includes a skin tone correction neural network 318 and a blemish smoothing neural network 322, which corresponds to similar neural networks introduced above with respect to FIG. 3.

As mentioned above, FIG. 6 includes the skin tone correction neural network 318. In one or more implementations, the skin tone correction neural network 318 includes a convolutional neural network with an architecture having a cascade of ResNet blocks using depth-wise separable convolutions and a single spatial pooling layer. In addition, in various implementations, the skin tone correction neural network 318 utilizes network pruning to further improve the efficiency of the network. In alternative implementations, the skin tone correction neural network 318 utilizes another type of deep learning neural network and/or additional or fewer architecture components.

As shown, the skin tone correction neural network 318 learns to generate retouched low-frequency layers 610 from the low-frequency input layers 608. In this manner, when the skin tone correction neural network 318 is trained, the image retouching system 106 utilizes the skin tone correction neural network 318 to generate retouched low-frequency layers from the low-frequency layers to perform skin tone corrections and other skin feature modifications, as described above in connection with FIG. 3.

In one or more implementations, the image retouching system 106 trains the skin tone correction neural network 318 utilizing training data 602 that includes image pairs of input images 604 (e.g., untouched images) and corresponding retouched images 606. Indeed, as described below, the image retouching system 106 trains the skin tone correction neural network 318 in a supervised manner using the retouched images 606 as a ground truth for corresponding input images 604 provided to the skin tone correction neural network 318 during training.

As shown, the image retouching system 106 runs the training data 602 for each image training pair through the face parser 304 to crop the image to a face portrait and/or generate a face mask, as described above with respect to FIG. 4. As also previously explained, the image retouching system 106 provides the skin mask to each skin correction neural network to assist in determining the areas in the image to apply image retouching. For simplicity, providing a skin mask to the neural networks is not shown in FIG. 6, but is shown in FIG. 3 above.

Because the skin tone correction neural network 318 processes low-frequency layers, in various implementations, the image retouching system 106 trains the skin tone correction neural network 318 with low-frequency versions of the training data. In these implementations, the image retouching system 106 utilizes the frequency separator 310 to generate low-frequency versions of the input images 604 and the retouched images 606, as described above. For example, the frequency separator 310 uses bilinear operations to downsize the training data 602 to the second fixed resolution to generate the low-frequency input layer 608 and the low-frequency retouched image 614. In alternative implementations, the image retouching system 106 trains the skin tone correction neural network 318 with full-size training data images or with different image sizes (e.g., based on low-frequency, mid-frequency, and/or high-frequency layers).

As part of training the skin tone correction neural network 318, in one or more implementations, the image retouching system 106 compares the output of the skin tone correction neural network 318 based on the input images 604 to corresponding ground truths (i.e., the retouched images 606). More particularly, in various implementations, the image retouching system 106 utilizes a skin tone correction loss model 612 to determine an amount of reconstruction error loss between the training data image pairs. In some implementations, the skin tone correction neural network 318 utilizes the reconstruction error loss provided via backpropagation and/or end-to-end learning to tune and optimize its neural network layers.

More particularly, in one or more implementations, the image retouching system 106 provides the low-frequency input layer 608 to the skin tone correction neural network 318. The skin tone correction neural network 318 processes the low-frequency input layer 608 through various neural network layers to retouch skin-based portions of the low-frequency input layer 608 (e.g., using a corresponding skin mask). Additionally, the skin tone correction neural network 318 outputs the retouched low-frequency layer 610.

Furthermore, the skin tone correction loss model 612 compares the retouched low-frequency layer 610 with the low-frequency retouched image 614 to determine a reconstruction error loss and back propagates the reconstruction error loss to tune the skin tone correction neural network 318. In response, the skin tone correction neural network 318 updates weights and parameters to minimize the reconstruction error loss. Indeed, the image retouching system 106 iteratively tunes and trains the skin tone correction neural network 318 to learn a set of best-fit parameters that corrects skin tones within images.

In example implementations, the image retouching system 106 trains the skin tone correction neural network 318 utilizing a first reconstruction loss type, such as least-square error reconstruction loss or L2 loss. In these implementations, by utilizing L2 loss at the skin tone correction loss model 612, the image retouching system 106 trains the skin tone correction neural network 318 to produce smoother image edits, which is beneficial for edits at the low-frequency level. Indeed, in various implementations, utilizing L2 loss also results in brighter skin such as under the eyes and the face itself.

In some implementations, the image retouching system 106 does not learn the residual as the skin tone correction neural network 318 automatically converges. Additionally, in various implementations, the image retouching system 106 allows resistance to model noise during the training of the skin tone correction neural network 318 as this resistance improves the network's ability to perform skin smoothing functions.

As shown, FIG. 6 also includes the blemish smoothing neural network 322. In one or more implementations, the blemish smoothing neural network 322 shares a similar architecture to the skin tone correction neural network 318. For example, in various implementations, the blemish smoothing neural network 322 includes a convolutional neural network with an architecture having a cascade of ResNet blocks using depth-wise separable convolutions and a single spatial pooling layer. In alternative implementations, the architecture of the blemish smoothing neural network 322 differs from that of the skin tone correction neural network 318.

Further, in various implementations, the image retouching system 106 trains the blemish smoothing neural network 322 in a similar manner as the skin tone correction neural network 318. Rather than using low-frequency layers, however, the image retouching system 106 utilizes mid-frequency versions of the training data 602. Further, in various implementations, the image retouching system 106 trains the blemish smoothing neural network 322 based on mid-frequency bands rather than the layers themselves. As mentioned above, the image retouching system 106 consistently achieves greater efficiency and fast processing times by processing frequency bands, which are much smaller, rather than processing frequency layers directly.

To illustrate, in various implementations, the image retouching system 106 pre-processes the training data 602 to generate the mid-frequency input band 616 and the mid-frequency retouched band 622. Further, the image retouching system 106 provides a skin mask corresponding to a training data image pair to the blemish smoothing neural network 322. Then, the blemish smoothing neural network 322 processes the mid-frequency input band 616 to generate the modified mid-frequency band 618, which is provided to a blemish smoothing loss model 620. The blemish smoothing loss model 620 determines an amount of reconstruction error loss (e.g., based on the mid-frequency retouched band 622), which is backpropagated to the blemish smoothing neural network 322 for updating of neural network parameters.

As another difference, in various implementations, the image retouching system 106 trains the blemish smoothing neural network 322 utilizing a second reconstruction loss type, such as least absolute deviation reconstruction or L1 loss. In these implementations, by utilizing L1 loss at the blemish smoothing loss model 620, the image retouching system 106 trains the skin tone correction neural network 318 to preserve sharp skin features and prevent oversmoothing, which is beneficial for edits at the mid-frequency level. Indeed, utilizing L1 loss results in improved preservation of detailed skin features, such as skin pores, and better removal of skin blemishes, such as moles, pimples, and speckles.

In many implementations, the image retouching system 106 trains the skin tone correction neural network 318 and the blemish smoothing neural network 322 separately. Indeed, while the image retouching system 106 optionally utilizes a shared set of training data 602 to train both networks, the image retouching system 106 trains each network independently. Further, while the networks share similar architecture, the image retouching system 106 trains the networks (e.g., utilizing different frequency layers as input as well as tuning the neural network layers based on different reconstruction losses (e.g., L1 vs. L2), to accomplish discrete objectives (e.g., color correction vs. skin blemish smoothing).

Figure 7:
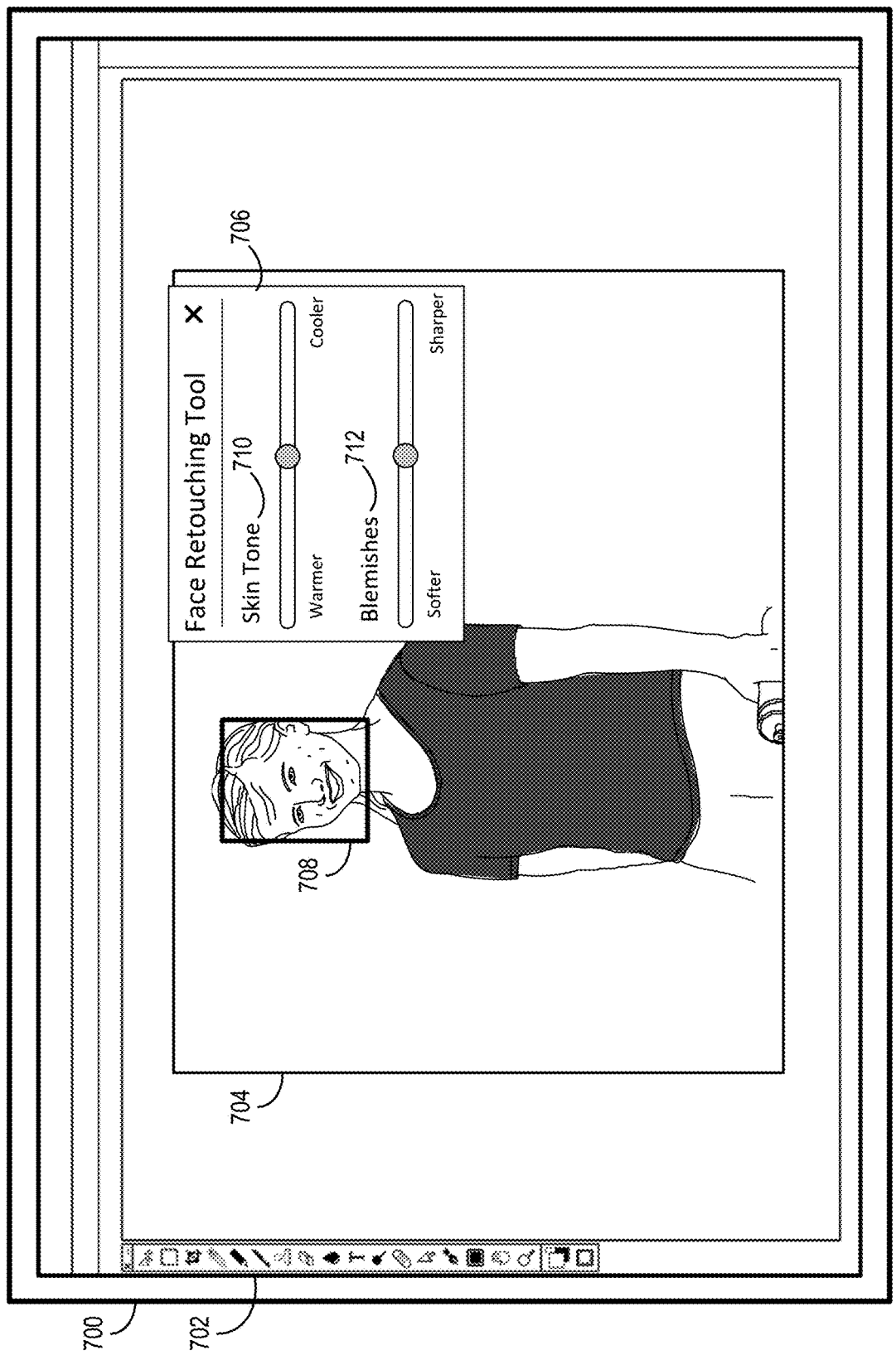
FIG. 7 illustrates a graphical user interface of customizing aspects of the image retouching system when retouching a digital image in accordance with one or more implementations.

Turning now to FIG. 7, a graphical example of customizing the image retouching system 106 when generating a retouched image is described. For example, FIG. 7 illustrates a graphical user interface of customizing aspects of the image retouching system when retouching a digital image in accordance with one or more implementations.

As shown, FIG. 7 includes a client device 700 having a graphical user interface 702 that includes an image 704 (i.e., a digital image). The client device 700 represents the client device 102 introduced above with respect to FIG. 1. For instance, the client device 700 includes an image editing application that implements the image editing system 104, which utilizes the image retouching system 106. Also, the image retouching system 106, or optionally the image editing application, generates the graphical user interface 702 in FIG. 7.

In one or more implementations, in response to detecting a user selecting an option to customize a retouched face within the image 704, the image editing system and/or the image retouching system 106 provides a retouching customization interface 706 (e.g., a second graphical user interface). For example, the image retouching system 106 provides the retouching customization interface 706 as a selection tool within the image editing application. In various implementations, the image editing system and/or the image retouching system 106 displays a bounding box 708 around (or otherwise emphasizes) the target face in the image being retouched.

As shown, the retouching customization interface 706 includes a first customization option 710 and a second customization option 712. In general, each customization option corresponds to a skin correction neural network of the image retouching system 106. In one or more implementations, the first customization option 710 corresponds to the skin tone correction neural network described above and the second customization option 712 corresponds to the blemish smoothing neural network described above. Indeed, because the skin correction neural network is separate and independent from each other, the image retouching system 106 has the ability to modify (e.g., customize) each network without influencing or affecting the other network(s). Accordingly, by separating the processing of the multiple skin correction neural networks, the image retouching system 106 provides customizable controls at different levels.

While the retouching customization interface 706 shows two customization options that correspond to the skin correction neural networks described above, in some implementations, the retouching customization interface 706 includes additional or different customization options. As one example, if the image retouching system 106 includes an additional skin correction neural network to modify the high-frequency layer, the retouching customization interface 706 optionally includes a third customization option that targets retouching a different set of skin features.

In another example, the image retouching system 106 is re-tooled for a different purpose, such as removing defects and noise from images (e.g., older scanned photos). Here, the retouching customization interface 706 optionally includes customization options corresponding to the mid-frequency layer and high-frequency layer. Indeed, in this example, the image retouching system 106 may retool the deep-learning neural networks for image restoration by focusing on the mid- and high-frequency layers for image correction while leaving the colors and image features in the low-frequency layer unmodified.

As mentioned above, in one or more implementations, the first customization option 710 corresponds to the skin tone correction neural network. According, based on a first user input increasing or decreasing the first customization option 710, the image retouching system 106 adjusts the magnitude of skin tone corrections in the low-frequency layer. For instance, in some implementations, the image retouching system 106 modifies one or more weights of the skin tone correction neural network to apply more corrections or fewer corrections in the low-frequency layer.

Similarly, in various implementations, the second customization option 712 corresponds to the blemish smoothing neural network. Here, based on a second user input increasing or decreasing the second customization option 712, the image retouching system 106 adjusts the magnitude of skin blemish corrections in the mid-frequency layer. For example, in one or more implementations, the image retouching system 106 blends the mid-frequency layer with the modified mid-frequency layer as part of generating the retouched image. Then, based on the second user input, the image retouching system 106 provides more weight to the mid-frequency layer (e.g., if the second user input decreases the amount of image correction), more weight to the modified mid-frequency layer (e.g., if the second user input increases the amount of image correction), or vice versa.

In various implementations, the image retouching system 106 regenerates and provides updated versions of the retouched image to the user. As mentioned above, in many implementations, the image retouching system 106 executes significantly faster than other systems, and with increased accuracy. Accordingly, in various implementations, the image retouching system 106 provides updated and customized retouched images to a user within the image editing application in real-time or near-real-time.

Figure 8:
FIG. 8 illustrates examples of digital images retouched by the image retouching system compared to corresponding retouched images from a state-of-the-art system.
Figure 8:
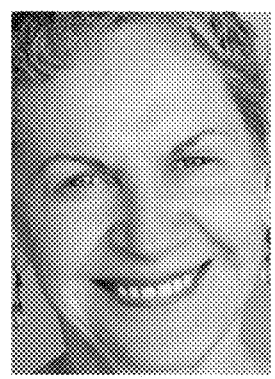
Figure 8:
Figure 8:
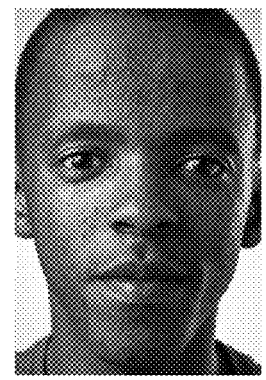
Figure 8:
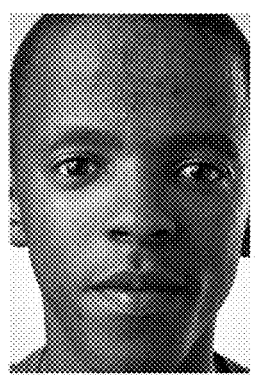
Figure 8:
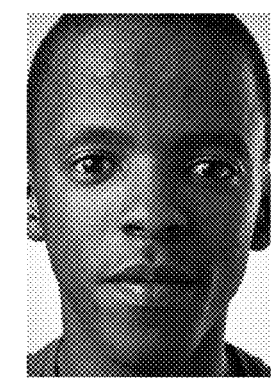
Figure 8:
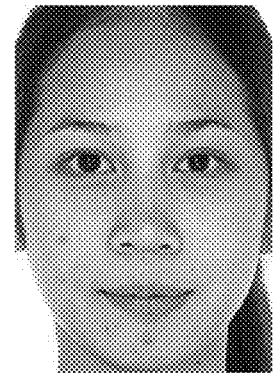
Figure 8:
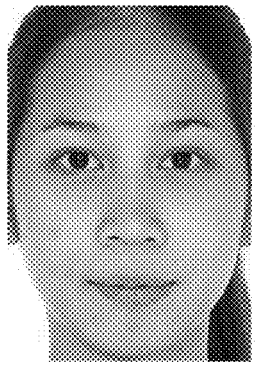
Figure 8:
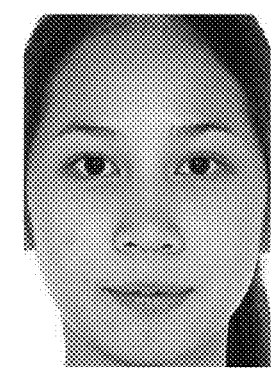

In addition to being more efficient and quicker, the image retouching system 106 achieves increased accuracy over conventional systems. To illustrate, FIG. 8 shows examples of digital images retouched by the image retouching system in accordance with one or more implementations compared to a state-of-the-art system. In particular, researchers compared results of the image retouching system 106 with those from a state-of-the-art system (i.e., the system described in U.S. Pat. No. 10,593,023) under equivalent testing conditions.

As shown, FIG. 8 includes input images 802 provided to the respective systems, state-of-the-art system output images 804, and image retouching system output images 806. As shown, the image retouching system output images 806 appear more realistic and accurate as they preserve important skin features and textures, as described above. Additionally, the image retouching system output images 806 show better skin blemish smoothing than the state-of-the-art system output images 804. In particular, the smoothing is more natural and uniform and the skin appears less plastic-like.

Further, while difficult to see in the black and white images, color image comparisons show that the image retouching system output images 806 better correct skin tones and colors compared to the state-of-the-art system output images 804. Indeed, the image retouching system output images 806 remove redness better than the state-of-the-art system output images 804.

Figure 9:
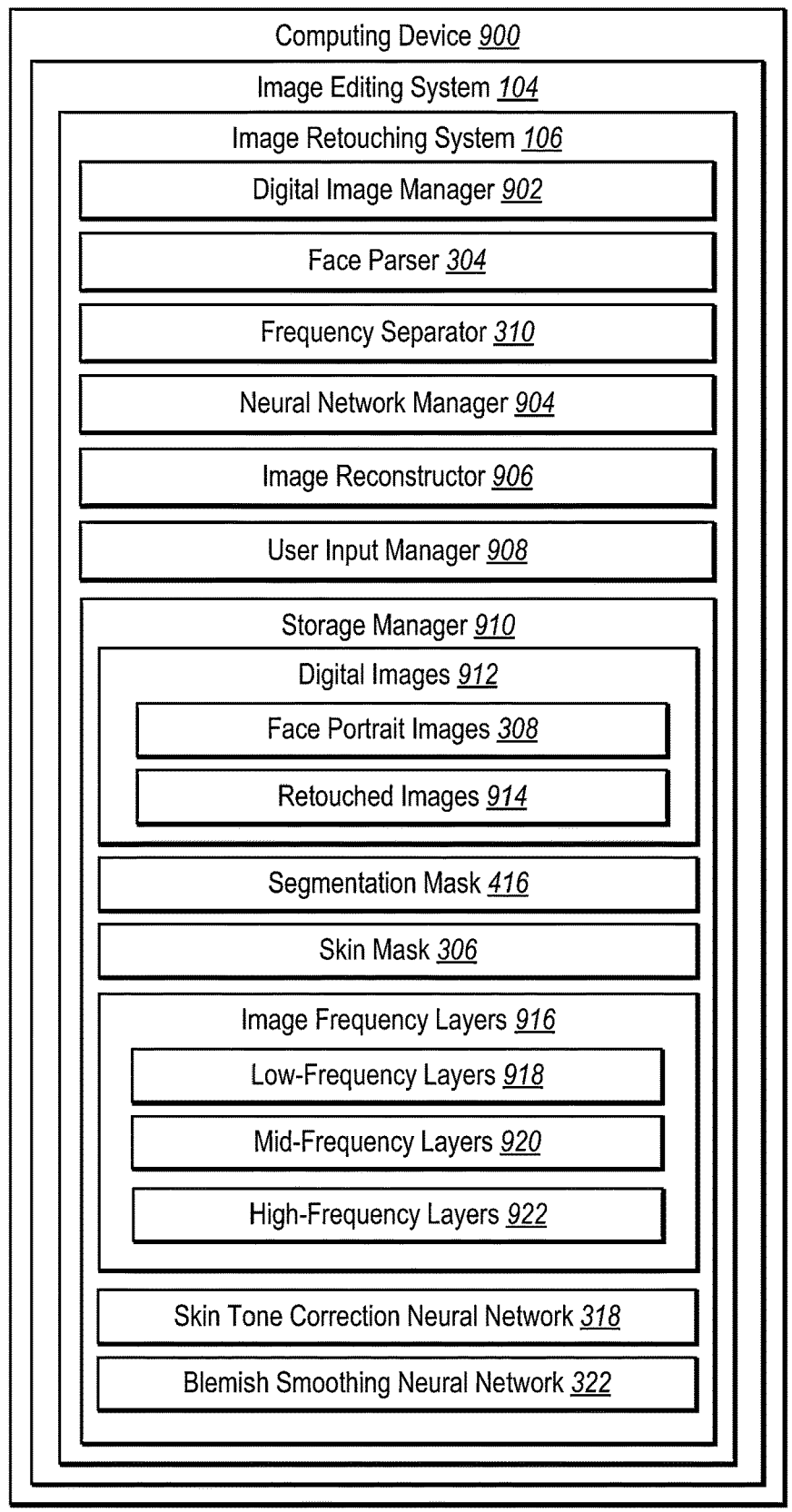
FIG. 9 illustrates a schematic diagram of the image retouching system in accordance with one or more implementations.

Referring now to FIG. 9, additional detail is provided regarding the capabilities and components of the image retouching system 106 in accordance with one or more implementations. In particular, FIG. 9 shows a schematic diagram of an example architecture of the image retouching system 106 implemented within the image editing system 104 and hosted on a computing device 900.

As shown, the image retouching system 106 is located on a computing device 900 within an image editing system 104. In general, the computing device 900 may represent various types of client devices. For example, in some implementations, the client is a mobile device, such as a laptop, a tablet, a mobile telephone, a smartphone, etc. In other implementations, the computing device 900 is a non-mobile device, such as a desktop or server, or another type of client device. Additional details with regard to the computing device 900 are discussed below as well as with respect to FIG. 11.

As illustrated in FIG. 9, the image retouching system 106 includes various components for performing the processes and features described herein. For example, the image retouching system 106 includes a digital image manager 902, a face parser 304, a frequency separator 310, a neural network manager 904, an image reconstructor 906, a user input manager 908, and a storage manager 910. As shown, the storage manager 910 includes digital images 912, a segmentation mask 416, a skin mask 306, image frequency layers 916, a skin tone correction neural network 318, and a blemish smoothing neural network 322. Each of the components mentioned above is described below in turn.

As mentioned above, the image retouching system 106 includes the digital image manager 902. In general, the digital image manager 902 facilitates identifying, accessing, receiving, obtaining, generating, importing, exporting, copying, modifying, removing, and organizing images. In one or more implementations, the digital image manager 902 operates in connection with an image editing system 104 (e.g., an image editing application) to access and edit images, as described previously. In some implementations, the digital image manager 902 communicates with the storage manager 910 to store and retrieve the digital images 912, for example, within a digital image database managed by the storage manager 910.

As shown, the image retouching system 106 includes the face parser 304. In one or more implementations, the face parser 304 represents the face parser 304 described above in connection with FIG. 3 and FIG. 4. For example, in various implementations, the face parser 304 detects one or more faces within digital images 912 and generates face portrait images 308 from the input images. In addition, in some implementations, the face parser 304 generates a segmentation mask 416 and/or a skin mask 306 of a digital image and/or face portrait, as described above.

As shown, the image retouching system 106 includes the frequency separator 310. In one or more implementations, the frequency separator 310 represents the frequency separator 310 described above in connection with FIG. 3 and FIG. 5. For example, the frequency separator 310 generates image frequency layers 916. In particular, in various implementations, the frequency separator 310 generates low-frequency layers 918, mid-frequency layers 920, and high-frequency layers 922, as described above. In additional implementations, the frequency separator 310 generates frequency bands, such as a mid-frequency band (i.e., stored as part of the mid-frequency layers 920) and a high-frequency band (i.e., stored as part of the high-frequency layers 922).

As shown, the image retouching system 106 includes the neural network manager 904. In various implementations, the neural network manager 904 generates, identifies, obtains, trains, tunes, applies, executes, modifies, inferences, and/or otherwise manages neural networks. For example, the neural network manager 904 trains and executes the skin tone correction neural network 318 and the blemish smoothing neural network 322 as described above in connection with FIG. 3 and FIG. 6. Indeed, in one or more implementations, the neural network manager 904 generates modified frequency layers and/or modified frequency bands for corresponding frequency layers and/or frequency bands, as previously described.

As shown, the image retouching system 106 includes the image reconstructor 906. In one or more implementations, the image reconstructor 906 receives, collects, combines, aggregates, merges, joins, associates, pools, and/or otherwise reconstructs frequency layers into retouched images 914. In one or more implementations, the image reconstructor 906 corresponds to the combiner 330 described above in connection with FIG. 3. In some implementations, the image reconstructor 906 generates a retouched image from multiple frequency layers. In additional or alternative implementations, the image reconstructor 906 generates a retouched image from multiple frequency bands (e.g., using a Laplacian formulation), as described above.

As shown, the image retouching system 106 includes the user input manager 908. In various implementations, the user input manager 908 is configured to detect, receive, and/or facilitate user input on the computing device 900 in a suitable manner. In some instances, the user input manager 908 detects one or more user interactions (e.g., a single interaction, or a combination of interactions) with respect to a user interface. For example, the user input manager 908 detects a user interaction from a keyboard, mouse, touchpad, touchscreen, and/or any other input device in connection with the computing device 900. For instance, the user input manager 908 detects user input with a retouching customization interface 706, as described above.

As shown, the image retouching system 106 includes the storage manager 910. As mentioned above, the storage manager 910 includes digital images 912, a segmentation mask 416, a skin mask 306, image frequency layers 916, a skin tone correction neural network 318, and a blemish smoothing neural network 322. Further, as shown, the digital images 912 includes the face portrait images 308, retouched images 914. The image frequency layers 916 include the low-frequency layers 918, the mid-frequency layers 920, and the high-frequency layer 922. As mentioned previously, the image frequency layers 916 also include frequency bands. Each of these elements is described above in connection to components of the image retouching system 106.

Each of the components of the image retouching system 106 optionally include software, hardware, or both. For example, the components optionally include one or more instructions stored on a computer-readable storage medium and executable by processors of one or more computing devices, such as a client device (e.g., a mobile client device) or server device. When executed by the one or more processors, the computer-executable instructions of the image retouching system 106 causes a computing device to perform the feature learning methods described herein. Alternatively, the components optionally include hardware, such as a special-purpose processing device to perform a certain function or group of functions. In addition, the components of the image retouching system 106 optionally includes a combination of computer-executable instructions and hardware.

Furthermore, the components of the image retouching system 106 may be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Additionally, the components may be implemented as one or more web-based applications hosted on a remote server. The components may also be implemented in a suite of mobile device applications or "apps." To illustrate, the components may be implemented in an application, including but not limited to ADOBE PHOTOSHOP, ADOBE CREATIVE CLOUD, LIGHTROOM, PHOTOSHOP ELEMENTS, PHOTOSHOP EXPRESS, PHOTOSHOP MOBILE, or other digital content applications software packages. The foregoing are either registered trademarks or trademarks of Adobe Inc. in the United States and/or other countries.

FIGS. 1-9, the corresponding text, and the examples provide a number of different methods, systems, devices, and non-transitory computer-readable media of the image retouching system 106. In addition to the foregoing, one or more implementations are described in terms of flowcharts comprising acts for accomplishing a particular result, such as the flowcharts of acts shown in FIG. 10. Additionally, the acts described herein may be repeated or performed in parallel with one another or parallel with different instances of the same or similar acts.

Figure 10:
FIG. 10 illustrates a flowchart of a series of acts of automatically retouching digital images in accordance with one or more implementations.
Figure 10:
Figure 10:

As mentioned, FIG. 10 illustrates a flowchart of a series of acts in accordance with one or more implementations. While FIG. 10 illustrates acts according to one implementation, alternative implementations may omit, add to, reorder, and/or modify any of the acts shown. The acts of FIG. 10 are optionally performed as part of a method. Alternatively, a non-transitory computer-readable medium comprises instructions that, when executed by one or more processors, cause a computing device to perform the acts of FIG. 10. In some implementations, a system is configured to perform the acts of FIG. 10.

To illustrate, FIG. 10 shows a flowchart of a series of acts 1000 of automatically retouching digital images in accordance with one or more implementations. In various implementations, the series of acts 1000 is implemented on one or more computing devices, such as the client device 102, the server device 108, the client device 700, or the computing device 900. In addition, in some implementations, the series of acts 1000 is implemented in a digital environment for creating or editing digital content (e.g., digital images). For example, the series of acts 1000 is implemented on one or more computing devices (e.g., server devices) having memory (or memory devices) that includes a digital image of a face, a first neural network to correct skin blemishes in mid-frequency images, and a second neural network to correct skin blemishes in low-frequency images.

The series of acts 1000 includes an act 1010 of separating an image into a high-frequency layer, a mid-frequency layer, and a low-frequency layer. In one or more implementations, the image includes a face and/or is a face portrait image. In a number of implementations, the act 1010 includes separating the digital image into the mid-frequency layer by downsampling and convoluting the digital image to a first fixed resolution (e.g., 512 pixels). In additional implementations, the act 1010 includes separating the digital image of the face into the low-frequency layer by downsampling the mid-frequency layer to a second fixed resolution (e.g., 64 pixels). In various implementations, the second fixed resolution is smaller than the first fixed resolution.

In some implementations, the act 1010 also includes generating a mid-frequency band by upsampling the low-frequency layer to the first fixed resolution and comparing the mid-frequency layer to the upsampled low-frequency layer to generate the mid-frequency band. In various implementations, the act 1010 includes utilizing bilinear filtering to downsample and bilinear interpolation to upsample frequency layers of the digital image.

As shown, the series of acts 1000 also includes an act 1020 of utilizing a first neural network to correct skin blemishes in the mid-frequency layer. In particular, the act 1020 involves generating a modified mid-frequency layer by utilizing a first neural network to correct skin blemishes in the mid-frequency layer. In one or more implementations, the act 1020 includes generating the modified mid-frequency layer by generating a depth-wise separable convolution in the mid-frequency layer and utilizing the first neural network to generate the modified mid-frequency layer from the depth-wise separable convolution.

In various implementations, the act 1020 includes utilizing the first neural network to generate a modified mid-frequency layer (e.g., a modified mid-frequency band) from the mid-frequency band. Further, in one or more implementations, the act 1020 includes generating the modified mid-frequency layer by utilizing the second neural network with the mid-frequency band to generate a modified mid-frequency band.

As shown in FIG. 10, the series of acts 1000 further includes an act 1030 of utilizing a second neural network to correct skin blemishes in the low-frequency layer. In particular, the act 1030 includes generating a modified low-frequency layer by utilizing a second neural network to correct skin blemishes in the low-frequency layer. In one or more implementations, the act 1030 includes utilizing the second neural network to generate a modified low-frequency layer from the low-frequency layer.

As shown, the series of acts 1000 also includes an act 1040 of combining the frequency layers to generate a retouched image. In particular, the act 1040 includes combining the high-frequency layer, the modified mid-frequency layer, and the modified low-frequency layer to generate a modified digital image of the face. In one or more implementations, the act 1040 includes combining the high-frequency layer, the modified mid-frequency layer, and the modified low-frequency layer utilizing a Laplacian formulation to reconstruct the modified digital image of the face. In some implementations, the modified mid-frequency layer is a modified mid-frequency band and/or the high-frequency layer is a modified high-frequency layer. In various implementations, the act 1040 includes providing the modified digital image of the face to a client device.

The series of acts 1000 optionally include additional acts. In one or more implementations, the series of acts 1000 includes acts of generating a skin mask identifying pixels of the digital image that include skin-based features, providing the skin mask to the first neural network for generating the modified mid-frequency layer based on the mid-frequency layer, and providing the skin mask to the second neural network for generating the modified low-frequency layer from the low-frequency layer. In additional implementations, the series of acts 1000 includes generating the skin mask by utilizing a semantic segmentation network to generate a segmentation mask of the digital image that labels each pixel with a face label (e.g., a skin label, a nose label, an eye label, a brow label, an ear label, a mouth label, a lip label, and a hair label) and generating the skin mask by assigning a first value to pixels from the segmentation mask having a face label corresponding to skin-based pixels (e.g., one of the skin label, the nose label, and the ear label) and a second value to other pixels from the segmentation mask.

In some implementations, the series of acts 1000 includes acts of modifying a magnitude of blemish smoothing by the first neural network based on a first user input when generating the modified mid-frequency layer and/or modifying a magnitude of skin tone correction by the second neural network based on a second user input when generating the low-frequency layer. In one or more implementations, the series of acts 1000 includes acts of displaying the digital image within a first graphical user interface at a client device; detecting, within a second graphical user interface displayed at a client device, a first input and a second input; and replacing the digital image within the first graphical user interface with the modified digital image of the face at the client device.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the image retouching system to generate retouched images as described herein.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media is any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which stores desired program code in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links for carrying desired program code in the form of computer-executable instructions or data structures and which is accessible by a general-purpose or special-purpose computer. Combinations of the above should also be included within the scope of computer-readable media.

Further, upon reaching various computer system components, program code means in the form of computer-executable instructions or data structures is transferred automatically from transmission media to non-transitory computer-readable storage media (devices) (or vice versa). For example, computer-executable instructions or data structures received over a network or data link is buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) optionally is included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure optionally are implemented in cloud computing environments. As used herein, the term "cloud computing" refers to a model for enabling on-demand network access to a shared pool of configurable computing resources. For example, cloud computing optionally is utilized in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model optionally is composed of various characteristics such as, for example, on-demand self-service, broad network access, resource pooling, rapid elasticity, measured service, and so forth. A cloud-computing model optionally implements various service models, such as, for example, Software as a Service ("SaaS"), Platform as a Service ("PaaS"), and Infrastructure as a Service ("IaaS"). A cloud-computing model is deployable using different deployment models such as private cloud, community cloud, public cloud, hybrid cloud, and so forth. In addition, as used herein, the term "cloud-computing environment" refers to an environment in which cloud computing is utilized.

Figure 11:
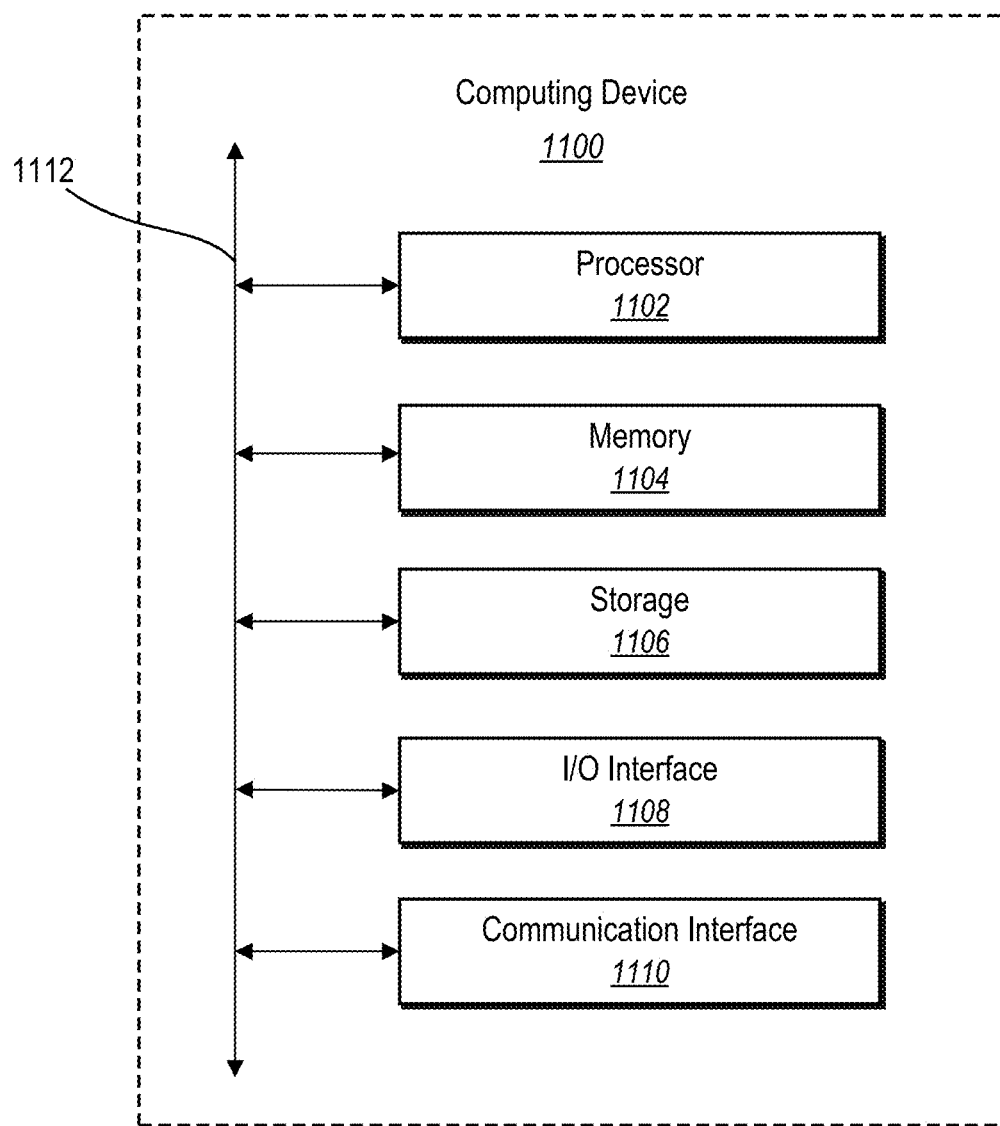
FIG. 11 illustrates a block diagram of an example computing device for implementing one or more implementations of the present disclosure.

FIG. 11 illustrates a block diagram of a computing device 1100 that may be configured to perform one or more of the processes described above. One will appreciate that one or more computing devices, such as the computing device 1100 may represent the computing devices described above (e.g., client device 102, the server device 108, the client device 700, or the computing device 900). In one or more implementations, the computing device 1100 may be a mobile device (e.g., a laptop, a tablet, a smartphone, a mobile telephone, a camera, a tracker, a watch, a wearable device, etc.). In some implementations, the computing device 1100 may be a non-mobile device (e.g., a desktop computer, a server device, a web server, a file server, a social networking system, a program server, an application store, or a content provider). Further, the computing device 1100 may be a server device that includes cloud-based processing and storage capabilities.

As shown in FIG. 11, the computing device 1100 includes one or more processor(s) 1102, memory 1104, a storage device 1106, I/O interfaces 1108 (i.e., input/output interfaces), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other implementations. Furthermore, in certain implementations, the computing device 1100 includes fewer components than those shown in FIG. 11. Components of the computing device 1100 shown in FIG. 11 will now be described in additional detail.

In particular implementations, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 includes a non-transitory storage medium described above. The storage device 1106 may include a hard disk drive (HDD), flash memory, a Universal Serial Bus (USB) drive or a combination of these or other storage devices.

As shown, the computing device 1100 includes one or more I/O interfaces 1108, which are provided to allow a user to provide input to (e.g., user strokes), receive output from, and otherwise transfer data to and from the computing device 1100. These I/O interfaces 1108 may include a mouse, keypad or a keyboard, a touch screen, camera, optical scanner, network interface, modem, another known I/O device, or a combination of these I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1108 are configured to provide graphical data to a display for presentation to a user. The graphical data may be representative of one or more graphical user interfaces and/or any other graphical content as may serve a particular implementation.

The computing device 1100 further includes a communication interface 1110. The communication interface 1110 includes hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 further includes a bus 1112. The bus 1112 includes hardware, software, or both that connects components of computing device 1100 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method, comprising:
    separating a digital image into a high-frequency layer and a mid-frequency layer;
    generating a modified mid-frequency layer by utilizing a first neural network to correct skin blemishes in the mid-frequency layer; and
    combining the high-frequency layer, the modified mid-frequency layer, and a low-frequency layer to generate a modified digital image.

2. The computer-implemented method of claim 1, wherein generating the modified mid-frequency layer comprises:
    generating a depth-wise separable convolution in the mid-frequency layer; and
    utilizing the first neural network to generate the modified mid-frequency layer from the depth-wise separable convolution.

3. The computer-implemented method of claim 1, further comprising combining the high-frequency layer, the modified mid-frequency layer, and the low-frequency layer utilizing a Laplacian formulation to reconstruct the modified digital image.

4. The computer-implemented method of claim 1, further comprising separating the digital image into the mid-frequency layer by downsampling and convoluting the digital image to a first fixed resolution.

5. The computer-implemented method of claim 1, further comprising generating a skin mask identifying pixels of the digital image that comprise skin-based features;

wherein generating the modified mid-frequency layer comprises utilizing the skin mask as an input to the first neural network.

6. The computer-implemented method of claim 1, further comprising generating a modified low-frequency layer by utilizing a second neural network to correct skin blemishes in the low-frequency layer;
   wherein combining the high-frequency layer, the modified mid-frequency layer, and the low-frequency layer to generate the modified digital image comprises combining the high-frequency layer, the modified mid-frequency layer, and the modified low-frequency layer.

7. A non-transitory computer-readable medium storing instructions that, when executed by at least one processor, cause the at least one processor to perform operations comprising:
   receiving a first user input to modify a first feature of a digital image;
   receiving a second user input to modify a second feature of the digital image;
   modifying the first feature based on the first user input by utilizing a first neural network to modify a first frequency layer of the digital image;
   modifying the second feature based on the second user input by utilizing a second neural network to modify a second frequency layer of the digital image; and
   combining the modified first frequency layer and the modified second frequency layer to generate a modified digital image.

8. The non-transitory computer-readable medium of claim 7, wherein modifying the first feature comprises modifying the first feature independently from the second feature.

9. The non-transitory computer-readable medium of claim 7, wherein:
   modifying the first feature comprises modifying defects by utilizing the first neural network to modify a mid-frequency layer of the digital image; and
   modifying the second feature comprises modifying noise by utilizing the second neural network to modify a high-frequency layer of the digital image.

10. The non-transitory computer-readable medium of claim 7, wherein:
    modifying the first feature comprises modifying a skin tone by utilizing the first neural network to modify a low-frequency layer of the digital image; and
    modifying the second feature comprises modifying blemishes by utilizing the second neural network to modify a mid-frequency layer of the digital image.

11. The non-transitory computer-readable medium of claim 10, wherein modifying blemishes comprises modifying one or more of scars, freckles, acne, dark spots, oiliness, or large pores.

12. The non-transitory computer-readable medium of claim 7, wherein combining the modified first frequency layer and the modified second frequency layer to generate the modified digital image comprises combining a modified low-frequency layer, a modified mid-frequency layer, and an un-modified high-frequency layer.

13. The non-transitory computer-readable medium of claim 12, wherein the operations further separating the digital image into a low-frequency layer by downsampling a mid-frequency layer to a second fixed resolution, wherein the second fixed resolution is smaller than a first fixed resolution of the mid-frequency layer.

14. The non-transitory computer-readable medium of claim 7, wherein the operations further comprise:
    providing a first graphical user interface element for the first feature; and
    providing a second graphical user interface element for the second feature;
    wherein:
       receiving the first user input to modify the first feature of the digital image comprises receiving a first indication of an editing magnitude via the first graphical user interface element; and
       receiving the second user input to modify the second feature of the digital image comprises receiving a second indication of an editing magnitude via the second graphical user interface element.

15. A system comprising:
    a memory device comprising a digital image, a first neural network, and a second neural network; and
    at least one computing device coupled to the memory device, the at least one computing device to cause the system to perform operations comprising:
       receiving a first user input to modify a first feature of a digital image;
       receiving a second user input to modify a second feature of the digital image;
       modifying the first feature based on the first user input by utilizing a first neural network to modify a first frequency layer of the digital image;
       modifying the second feature based on the second user input by utilizing a second neural network to modify a second frequency layer of the digital image; and
       combining the modified first frequency layer and the modified second frequency layer to generate a modified digital image.

16. The system of claim 15, wherein:
    modifying the first feature comprises modifying defects by utilizing the first neural network to modify a mid-frequency layer of the digital image; and
    modifying the second feature comprises modifying noise by utilizing the second neural network to modify a high-frequency layer of the digital image.

17. The system of claim 15, wherein:
    modifying the first feature comprises modifying a skin tone by utilizing the first neural network to modify a low-frequency layer of the digital image; and
    modifying the second feature comprises modifying blemishes by utilizing the second neural network to modify a mid-frequency layer of the digital image.

18. The system of claim 15, wherein combining the modified first frequency layer and the modified second frequency layer to generate the modified digital image comprises combining a modified low-frequency layer, a modified mid-frequency layer, and an un-modified high-frequency layer.

19. The system of claim 18, wherein the operations further comprise:
    generating the mid-frequency layer by using bilinear filtering to downsample the digital image to a first fixed resolution; and
    generating the low-frequency layer by using bilinear filtering to downsample the mid-frequency layer to a second fixed resolution.

20. The system of claim 15, wherein the operations further comprise:
    providing a first graphical user interface element for the first feature; and
    providing a second graphical user interface element for the second feature;
    wherein:

receiving the first user input to modify the first feature of the digital image comprises receiving a first indication of an editing magnitude via the first graphical user interface element; and receiving the second user input to modify the second feature of the digital image comprises receiving a second indication of an editing magnitude via the second graphical user interface element.

\* \* \* \* \*